(12) United States Patent  
Jones et al.

(10) Patent No.: US 8,659,256 B2  
(45) Date of Patent: Feb. 25, 2014

(54) ROBOT CONFINEMENT

(75) Inventors: Joseph L. Jones, Acton, MA (US); Philip R. Mass, Denver, CO (US)

(73) Assignee: iRobot Corporation, Bedford, MA (US)

( * ) Notice: Subject to any disclaimer, the term of this patent is extended or adjusted under 35 U.S.C. 154(b) by 84 days.

(21) Appl. No.: 12/827,126

(22) Filed: Jun. 30, 2010

(65) Prior Publication Data

US 2010/0312429 A1    Dec. 9, 2010

Related U.S. Application Data

(60) Continuation of application No. 12/540,564, filed on Aug. 13, 2009, which is a continuation of application No. 11/929,558, filed on Oct. 30, 2007, now Pat. No. 7,579,803, which is a continuation of application No. 11/691,735, filed on Mar. 27, 2007, now abandoned, which is a continuation of application No. 11/221,392, filed on Sep. 8, 2005, now Pat. No. 7,196,487, which is a continuation of application No. 10/921,775, filed on Aug. 19, 2004, now Pat. No. 6,965,209, which is a continuation of application No. 10/696,456, filed on Oct. 29, 2003, now Pat. No. 6,781,338, which is a division of application No. 10/056,804, filed on Jan. 24, 2002, now Pat. No. 6,690,134.

(60) Provisional application No. 60/263,692, filed on Jan. 24, 2001.

(51) Int. Cl.  
*G05B 19/10* (2006.01)

(52) U.S. Cl.  
USPC ............. 318/567; 318/568.12; 318/16; 901/1

(58) Field of Classification Search  
USPC ............................ 318/567, 568.12, 16; 901/1  
See application file for complete search history.

(56) References Cited

U.S. PATENT DOCUMENTS 2,136,324 A    11/1938    Louis  
3,457,575 A    7/1969    Bienek  
(Continued)

FOREIGN PATENT DOCUMENTS

DE    10242257    4/2003  
DE    102004038074    6/2005  
(Continued)

OTHER PUBLICATIONS

Morland, "Autonomous Lawnmower Control," Downloaded from the internet at: http://cns.bu.edu/~cjmorlan/robotics/lawnrnower/report.pdf, 10 pages, Jul. 24, 2002.

(Continued)

*Primary Examiner* — Erick Glass  
(74) *Attorney, Agent, or Firm* — Fish & Richardson P.C.

(57) ABSTRACT

A robot confinement system includes a portable housing and a mobile robot. The portable housing includes an emitter operable to emit a first signal when a presence of the robot is detected in a field of detection. The robot includes a controller operable to control a movement path of the robot on a surface and a cleaner operable to clean the surface as the robot moves on the surface. The robot further includes a detector operable to detect the first signal emitted by the portable housing. The controller is operable to change the movement path of the robot in response to detection of the first signal. One of the portable housing and the robot is operable to detect a second signal generated by the other of the portable housing and the robot to detect the presence of the robot in the field of detection.

31 Claims, 12 Drawing Sheets

(56) References Cited

U.S. PATENT DOCUMENTS

| | | |
|---|---|---|
| 3,550,714 A | 12/1970 | Bellinger |
| 3,674,316 A | 7/1972 | De Brey |
| 3,937,174 A | 2/1976 | Haaga |
| 4,099,284 A | 7/1978 | Shinozaki et al. |
| 4,119,900 A | 10/1978 | Kremnitz |
| 4,306,329 A | 12/1981 | Yokoi |
| 4,369,543 A | 1/1983 | Chen et al. |
| 4,513,469 A | 4/1985 | Godfrey et al. |
| 4,556,313 A | 12/1985 | Miller, Jr. et al. |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli |
| 4,700,301 A | 10/1987 | Dyke |
| 4,700,427 A | 10/1987 | Knepper |
| 4,716,621 A | 1/1988 | Zoni |
| 4,733,430 A | 3/1988 | Westergren |
| 4,733,431 A | 3/1988 | Martin |
| 4,756,049 A | 7/1988 | Uehara |
| 4,777,416 A | 10/1988 | George, II et al. |
| 4,782,550 A | 11/1988 | Jacobs |
| 4,811,228 A | 3/1989 | Hyyppa |
| 4,815,157 A | 3/1989 | Tsuchiya |
| 4,854,000 A | 8/1989 | Takimoto |
| 4,887,415 A | 12/1989 | Martin |
| 4,893,025 A | 1/1990 | Lee |
| 4,901,394 A | 2/1990 | Nakamura et al. |
| 4,912,643 A | 3/1990 | Beirxe |
| 4,918,441 A | 4/1990 | Bohman |
| 4,919,224 A | 4/1990 | Shyu et al. |
| 4,920,605 A | 5/1990 | Takashima |
| 4,933,864 A | 6/1990 | Evans, Jr. et al. |
| 4,956,891 A | 9/1990 | Wulff |
| 4,962,453 A | 10/1990 | Pong et al. |
| 4,974,283 A | 12/1990 | Holsten et al. |
| 5,002,145 A | 3/1991 | Waqkaumi et al. |
| 5,032,775 A | 7/1991 | Mizuno et al. |
| 5,086,535 A | 2/1992 | Grossmeyer et al. |
| 5,093,955 A | 3/1992 | Blehert et al. |
| 5,105,502 A | 4/1992 | Takashima |
| 5,109,566 A | 5/1992 | Kobayashi et al. |
| 5,115,538 A | 5/1992 | Cochran et al. |
| 5,136,750 A | 8/1992 | Takashima et al. |
| 5,142,985 A | 9/1992 | Stearns et al. |
| 5,144,715 A | 9/1992 | Matsuyo et al. |
| 5,152,028 A | 10/1992 | Hirano |
| 5,163,202 A | 11/1992 | Kawakami et al. |
| 5,165,064 A | 11/1992 | Mattaboni |
| 5,182,833 A | 2/1993 | Yamaguchi et al. |
| 5,204,814 A | 4/1993 | Noonan et al. |
| 5,208,521 A | 5/1993 | Aoyama |
| 5,216,777 A | 6/1993 | Moro et al. |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,279,672 A | 1/1994 | Betker et al. |
| 5,284,522 A | 2/1994 | Kobayashi et al. |
| 5,293,955 A | 3/1994 | Lee |
| 5,303,448 A | 4/1994 | Hennessey et al. |
| 5,309,592 A | 5/1994 | Hiratsuka |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,369,347 A | 11/1994 | Yoo |
| 5,410,479 A | 4/1995 | Coker |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,471,391 A * | 11/1995 | Gudat et al. ............... 701/50 |
| 5,497,529 A | 3/1996 | Boesi |
| 5,507,067 A | 4/1996 | Hoekstra et al. |
| 5,515,572 A | 5/1996 | Hoekstra et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,709,007 A | 1/1998 | Chiang |
| 5,714,119 A | 2/1998 | Kawagoe et al. |
| 5,717,484 A | 2/1998 | Hamaguchi et al. |
| 5,720,077 A | 2/1998 | Nakamura et al. |
| 5,735,959 A | 4/1998 | Kubo et al. |
| 5,761,762 A | 6/1998 | Kubo |
| 5,781,960 A | 7/1998 | Kilstrom et al. |
| 5,787,545 A | 8/1998 | Colens |
| 5,794,297 A | 8/1998 | Muta |
| 5,812,267 A | 9/1998 | Everett, Jr. et al. |
| 5,815,880 A | 10/1998 | Nakanishi |
| 5,819,008 A | 10/1998 | Asama et al. |
| 5,820,821 A | 10/1998 | Kawagoe et al. |
| 5,825,981 A | 10/1998 | Matsuda |
| 5,839,156 A | 11/1998 | Park et al. |
| 5,841,259 A | 11/1998 | Kim et al. |
| 5,867,800 A | 2/1999 | Leif |
| 5,869,910 A | 2/1999 | Colens |
| 5,903,124 A | 5/1999 | Kawakami |
| 5,926,909 A | 7/1999 | McGee |
| 5,935,179 A | 8/1999 | Kleiner et al. |
| 5,940,927 A | 8/1999 | Haegermarck et al. |
| 5,940,930 A | 8/1999 | Oh et al. |
| 5,942,869 A | 8/1999 | Katou et al. |
| 5,943,730 A | 8/1999 | Boomgaarden |
| 5,943,733 A | 8/1999 | Tagliaferri |
| 5,947,225 A | 9/1999 | Kawakami et al. |
| 5,959,423 A | 9/1999 | Nakanishi et al. |
| 5,974,348 A * | 10/1999 | Rocks ............... 701/28 |
| 5,991,951 A | 11/1999 | Kubo et al. |
| 5,995,884 A * | 11/1999 | Allen et al. ............... 701/24 |
| 5,998,953 A | 12/1999 | Nakamura et al. |
| 6,025,687 A | 2/2000 | Himeda et al. |
| 6,038,501 A | 3/2000 | Kawakami |
| 6,041,471 A | 3/2000 | Charky et al. |
| 6,076,025 A | 6/2000 | Ueno et al. |
| 6,108,076 A | 8/2000 | Hanseder |
| 6,112,143 A | 8/2000 | Allen et al. |
| 6,112,996 A | 9/2000 | Matsuo |
| 6,119,057 A | 9/2000 | Kawagoe |
| 6,124,694 A | 9/2000 | Bancroft et al. |
| 6,138,063 A | 10/2000 | Himeda |
| 6,142,252 A | 11/2000 | Kinto et al. |
| 6,226,830 B1 | 5/2001 | Hendriks et al. |
| 6,240,342 B1 | 5/2001 | Fiegert et al. |
| 6,255,793 B1 | 7/2001 | Peless et al. |
| 6,259,979 B1 | 7/2001 | Holmquist |
| 6,285,930 B1 | 9/2001 | Dickson et al. |
| 6,300,737 B1 | 10/2001 | Bergvall et al. |
| 6,321,515 B1 | 11/2001 | Colens |
| 6,339,735 B1 | 1/2002 | Peless et al. |
| 6,374,155 B1 | 4/2002 | Wallach et al. |
| 6,385,515 B1 | 5/2002 | Dickson et al. |

(56) References Cited

U.S. PATENT DOCUMENTS

| | | | |
|---|---|---|---|
| 6,389,329 B1 * | 5/2002 | Colens | 700/262 |
| 6,408,226 B1 | 6/2002 | Byrne et al. | |
| 6,430,471 B1 | 8/2002 | Kintou et al. | |
| 6,438,456 B1 | 8/2002 | Feddema et al. | |
| 6,442,476 B1 | 8/2002 | Poropat | |
| 6,443,509 B1 | 9/2002 | Levin et al. | |
| 6,444,003 B1 | 9/2002 | Sutcliffe | |
| 6,459,955 B1 | 10/2002 | Bartsch et al. | |
| 6,463,368 B1 | 10/2002 | Feiten et al. | |
| 6,465,982 B1 | 10/2002 | Bergvall et al. | |
| 6,493,612 B1 | 12/2002 | Bisset et al. | |
| 6,493,613 B2 | 12/2002 | Peless et al. | |
| 6,496,754 B2 | 12/2002 | Song et al. | |
| 6,496,755 B2 | 12/2002 | Wallach et al. | |
| 6,507,773 B2 | 1/2003 | Parker et al. | |
| 6,525,509 B1 | 2/2003 | Petersson et al. | |
| 6,532,404 B2 | 3/2003 | Colens | |
| 6,535,793 B2 | 3/2003 | Allard | |
| 6,548,982 B1 | 4/2003 | Papanikolopoulos et al. | |
| 6,553,612 B1 | 4/2003 | Dyson et al. | |
| 6,571,415 B2 | 6/2003 | Gerber et al. | |
| 6,574,536 B1 | 6/2003 | Kawagoe et al. | |
| 6,580,246 B2 | 6/2003 | Jacobs | |
| 6,584,376 B1 | 6/2003 | Van Kommer | |
| 6,594,844 B2 | 7/2003 | Jones | |
| 6,601,265 B1 | 8/2003 | Burlington | |
| 6,604,021 B2 | 8/2003 | Imai et al. | |
| 6,604,022 B2 | 8/2003 | Parker et al. | |
| 6,605,156 B1 | 8/2003 | Clark et al. | |
| 6,611,120 B2 | 8/2003 | Song et al. | |
| 6,611,734 B2 | 8/2003 | Parker et al. | |
| 6,611,738 B2 | 8/2003 | Ruffner | |
| 6,615,108 B1 | 9/2003 | Peless et al. | |
| 6,658,693 B1 | 12/2003 | Reed, Jr. | |
| 6,661,239 B1 | 12/2003 | Ozick | |
| 6,671,592 B1 | 12/2003 | Bisset et al. | |
| 6,690,134 B1 | 2/2004 | Jones et al. | |
| 6,741,054 B2 | 5/2004 | Koselka et al. | |
| 6,748,297 B2 | 6/2004 | Song et al. | |
| 6,760,647 B2 | 7/2004 | Nourbakhsh et al. | |
| 6,764,373 B1 | 7/2004 | Osawa et al. | |
| 6,774,596 B1 | 8/2004 | Bisset | |
| 6,781,338 B2 | 8/2004 | Jones et al. | |
| 6,809,490 B2 | 10/2004 | Jones et al. | |
| 6,830,120 B1 | 12/2004 | Yashima et al. | |
| 6,841,963 B2 | 1/2005 | Song et al. | |
| 6,845,297 B2 | 1/2005 | Allard | |
| 6,865,447 B2 | 3/2005 | Lau et al. | |
| 6,870,792 B2 | 3/2005 | Chiappetta | |
| 6,883,201 B2 | 4/2005 | Jones et al. | |
| 6,901,624 B2 | 6/2005 | Mori et al. | |
| D510,066 S | 9/2005 | Hickey et al. | |
| 6,938,298 B2 | 9/2005 | Aasen | |
| 6,940,291 B1 | 9/2005 | Ozick | |
| 6,956,348 B2 | 10/2005 | Landry et al. | |
| 6,965,209 B2 | 11/2005 | Jones et al. | |
| 6,971,140 B2 | 12/2005 | Kim | |
| 6,999,850 B2 | 2/2006 | McDonald | |
| 7,024,278 B2 | 4/2006 | Chiappetta et al. | |
| 7,024,280 B2 | 4/2006 | Parker et al. | |
| 7,053,578 B2 | 5/2006 | Diehl et al. | |
| 7,055,210 B2 | 6/2006 | Keppler et al. | |
| 7,069,124 B1 | 6/2006 | Whittaker et al. | |
| 7,079,923 B2 | 7/2006 | Abramson et al. | |
| 7,085,624 B2 | 8/2006 | Aldred et al. | |
| 7,133,746 B2 | 11/2006 | Abramson et al. | |
| 7,155,308 B2 | 12/2006 | Jones | |
| 7,196,487 B2 | 3/2007 | Jones et al. | |
| 7,201,786 B2 | 4/2007 | Wegelin et al. | |
| 7,206,677 B2 | 4/2007 | Hulden | |
| 7,225,500 B2 | 6/2007 | Diehl et al. | |
| 7,246,405 B2 | 7/2007 | Yan | |
| 7,248,951 B2 | 7/2007 | Hulden | |
| 7,318,248 B1 | 1/2008 | Yan | |
| 7,324,870 B2 | 1/2008 | Lee | |
| 7,352,153 B2 | 4/2008 | Yan | |
| 7,359,766 B2 | 4/2008 | Jeon et al. | |
| 7,408,157 B2 | 8/2008 | Yan | |
| 7,418,762 B2 | 9/2008 | Arai et al. | |
| 7,515,991 B2 | 4/2009 | Egawa et al. | |
| 7,567,052 B2 | 7/2009 | Jones et al. | |
| 7,568,259 B2 | 8/2009 | Yan | |
| 7,579,803 B2 | 8/2009 | Jones et al. | |
| 7,600,521 B2 | 10/2009 | Woo | |
| 7,647,144 B2 | 1/2010 | Haegermarck | |
| 7,650,666 B2 | 1/2010 | Jang | |
| 7,660,650 B2 | 2/2010 | Kawagoe et al. | |
| 7,693,605 B2 | 4/2010 | Park | |
| 7,720,554 B2 | 5/2010 | DiBernardo et al. | |
| 7,801,645 B2 | 9/2010 | Taylor et al. | |
| 7,805,220 B2 | 9/2010 | Taylor et al. | |
| 7,920,941 B2 | 4/2011 | Park et al. | |
| 7,937,800 B2 | 5/2011 | Yan | |
| 7,957,836 B2 | 6/2011 | Myeong et al. | |
| 8,368,339 B2 | 2/2013 | Jones et al. | |
| 2001/0004719 A1 | 6/2001 | Sommer | |
| 2001/0013929 A1 | 8/2001 | Torsten | |
| 2001/0020200 A1 | 9/2001 | Das et al. | |
| 2001/0025183 A1 | 9/2001 | Shahidi | |
| 2001/0037163 A1 | 11/2001 | Allard | |
| 2001/0043509 A1 | 11/2001 | Green et al. | |
| 2001/0045883 A1 | 11/2001 | Holdaway et al. | |
| 2001/0047231 A1 | 11/2001 | Peless et al. | |
| 2001/0047895 A1 | 12/2001 | De et al. | |
| 2002/0011367 A1 | 1/2002 | Kolesnik | |
| 2002/0011813 A1 | 1/2002 | Koselka et al. | |
| 2002/0016649 A1 | 2/2002 | Jones | |
| 2002/0021219 A1 | 2/2002 | Edwards | |
| 2002/0027652 A1 | 3/2002 | Paromtchik et al. | |
| 2002/0036779 A1 | 3/2002 | Kiyoi et al. | |
| 2002/0081937 A1 | 6/2002 | Yamada et al. | |
| 2002/0095239 A1 | 7/2002 | Wallach et al. | |
| 2002/0097400 A1 | 7/2002 | Jung et al. | |
| 2002/0104963 A1 | 8/2002 | Mancevski | |
| 2002/0108209 A1 | 8/2002 | Peterson | |
| 2002/0112742 A1 | 8/2002 | Bredo et al. | |
| 2002/0113973 A1 | 8/2002 | Ge | |
| 2002/0116089 A1 | 8/2002 | Kirkpatrick | |
| 2002/0120364 A1 | 8/2002 | Colens | |
| 2002/0124343 A1 | 9/2002 | Reed | |
| 2002/0153185 A1 | 10/2002 | Song et al. | |
| 2002/0156556 A1 | 10/2002 | Ruffner | |
| 2002/0159051 A1 | 10/2002 | Guo | |
| 2002/0166193 A1 | 11/2002 | Kasper | |
| 2002/0169521 A1 | 11/2002 | Goodman et al. | |
| 2002/0173877 A1 | 11/2002 | Zweig | |
| 2002/0189871 A1 | 12/2002 | Won | |
| 2003/0019071 A1 | 1/2003 | Field et al. | |
| 2003/0023356 A1 | 1/2003 | Keable | |
| 2003/0025472 A1 | 2/2003 | Jones et al. | |
| 2003/0060928 A1 | 3/2003 | Abramson et al. | |
| 2003/0120389 A1 | 6/2003 | Abramson et al. | |
| 2003/0137268 A1 | 7/2003 | Papanikolopoulos et al. | |
| 2003/0192144 A1 | 10/2003 | Song et al. | |
| 2003/0216834 A1 | 11/2003 | Allard | |
| 2003/0233177 A1 | 12/2003 | Johnson et al. | |
| 2004/0020000 A1 | 2/2004 | Jones | |
| 2004/0030448 A1 | 2/2004 | Solomon | |
| 2004/0030449 A1 | 2/2004 | Solomon | |
| 2004/0030450 A1 | 2/2004 | Solomon | |
| 2004/0030571 A1 | 2/2004 | Solomon | |
| 2004/0031113 A1 | 2/2004 | Wosewick et al. | |
| 2004/0049877 A1 | 3/2004 | Jones et al. | |
| 2004/0068351 A1 | 4/2004 | Solomon | |
| 2004/0068415 A1 | 4/2004 | Solomon | |
| 2004/0068416 A1 | 4/2004 | Solomon | |
| 2004/0074044 A1 | 4/2004 | Diehl et al. | |
| 2004/0076324 A1 | 4/2004 | Burl et al. | |
| 2004/0088079 A1 | 5/2004 | Lavarec et al. | |
| 2004/0111184 A1 | 6/2004 | Chiappetta et al. | |
| 2004/0134336 A1 | 7/2004 | Solomon | |
| 2004/0134337 A1 | 7/2004 | Solomon | |
| 2004/0156541 A1 | 8/2004 | Jeon et al. | |
| 2004/0158357 A1 | 8/2004 | Lee et al. | |

(56) References Cited

U.S. PATENT DOCUMENTS

| | | |
|---|---|---|
| 2004/0187457 A1 | 9/2004 | Colens |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0000543 A1 | 1/2005 | Taylor et al. |
| 2005/0010331 A1 | 1/2005 | Taylor et al. |
| 2005/0150519 A1 | 7/2005 | Keppler et al. |
| 2005/0156562 A1 | 7/2005 | Cohen et al. |
| 2005/0187678 A1 | 8/2005 | Myeong et al. |
| 2005/0204717 A1 | 9/2005 | Colens |
| 2005/0209736 A1 | 9/2005 | Kawagoe |
| 2005/0213082 A1 | 9/2005 | DiBernardo et al. |
| 2005/0235451 A1 | 10/2005 | Yan |
| 2005/0273967 A1 | 12/2005 | Taylor et al. |
| 2006/0020369 A1 | 1/2006 | Taylor et al. |
| 2006/0020370 A1 | 1/2006 | Abramson |
| 2006/0061657 A1 | 3/2006 | Rew et al. |
| 2006/0100741 A1 | 5/2006 | Jung |
| 2006/0259194 A1 | 11/2006 | Chiu |
| 2007/0017061 A1 | 1/2007 | Yan |
| 2007/0028574 A1 | 2/2007 | Yan |
| 2007/0032904 A1 | 2/2007 | Kawagoe et al. |
| 2007/0179670 A1 | 8/2007 | Chiappetta et al. |
| 2007/0213892 A1 | 9/2007 | Jones et al. |
| 2007/0250212 A1 | 10/2007 | Halloran et al. |
| 2007/0290649 A1 | 12/2007 | Jones et al. |
| 2008/0015738 A1 | 1/2008 | Casey et al. |
| 2008/0039974 A1 | 2/2008 | Sandin et al. |
| 2008/0184518 A1 | 8/2008 | Taylor et al. |
| 2008/0302586 A1 | 12/2008 | Yan |
| 2009/0319083 A1 | 12/2009 | Jones et al. |
| 2010/0063628 A1 | 3/2010 | Landry et al. |
| 2010/0268384 A1* | 10/2010 | Jones et al. .................. 700/253 |

FOREIGN PATENT DOCUMENTS

| | | |
|---|---|---|
| DE | 10357636 | 7/2005 |
| DE | 102005046813 | 4/2007 |
| EP | 0 792 726 | 9/1997 |
| EP | 1149333 | 11/2002 |
| EP | 1 331 537 | 7/2003 |
| EP | 1 380 245 | 1/2004 |
| EP | 1380246 | 1/2004 |
| EP | 1 557 730 | 7/2005 |
| EP | 1642522 | 4/2006 |
| EP | 1672455 A1 | 6/2006 |
| FR | 2 828 589 | 2/2003 |
| GB | 2225221 | 5/1990 |
| GB | 2 283 838 | 5/1995 |
| GB | 2409966 | 7/2005 |
| JP | 59-33511 | 3/1984 |
| JP | 62-120510 | 6/1987 |
| JP | 62-154008 | 7/1987 |
| JP | 62-292126 | 12/1987 |
| JP | 63-183032 | 7/1988 |
| JP | 63-241610 | 10/1988 |
| JP | 02-006312 | 1/1990 |
| JP | 2-283343 | 11/1990 |
| JP | 03-051023 | 3/1991 |
| JP | 5-46246 | 2/1993 |
| JP | 5-84200 | 4/1993 |
| JP | 06-327598 | 11/1994 |
| JP | 07-129239 | 5/1995 |
| JP | 7-222705 | 8/1995 |
| JP | 7-281742 | 10/1995 |
| JP | 07-281752 | 10/1995 |
| JP | 07-295636 | 11/1995 |
| JP | 7-295638 | 11/1995 |
| JP | 07-313417 | 12/1995 |
| JP | 07-319542 | 12/1995 |
| JP | 7-334242 | 12/1995 |
| JP | 08-016241 | 1/1996 |
| JP | 08-016776 | 1/1996 |
| JP | 08-063229 | 3/1996 |
| JP | 08-089451 | 4/1996 |
| JP | 08-123548 | 5/1996 |
| JP | 8-152916 | 6/1996 |
| JP | 08-152916 | 6/1996 |
| JP | 08-256960 | 10/1996 |
| JP | 08-263137 | 10/1996 |
| JP | 08-286741 | 11/1996 |
| JP | 08-286744 | 11/1996 |
| JP | 08-286745 | 11/1996 |
| JP | 08-286747 | 11/1996 |
| JP | 08-322774 | 12/1996 |
| JP | 08-335112 | 12/1996 |
| JP | 09-047413 | 2/1997 |
| JP | 09-066855 | 3/1997 |
| JP | 9-160644 | 6/1997 |
| JP | 09-179625 | 7/1997 |
| JP | 9-179625 | 7/1997 |
| JP | 09-185410 | 7/1997 |
| JP | 09-204223 | 8/1997 |
| JP | 09-204224 | 8/1997 |
| JP | 9-206258 | 8/1997 |
| JP | 9-251318 | 9/1997 |
| JP | 09-265319 | 10/1997 |
| JP | 09-269807 | 10/1997 |
| JP | 09-269810 | 10/1997 |
| JP | 09-269824 | 10/1997 |
| JP | 09-319431 | 12/1997 |
| JP | 09-319432 | 12/1997 |
| JP | 09-319434 | 12/1997 |
| JP | 09-325812 | 12/1997 |
| JP | 10-027020 | 1/1998 |
| JP | 10-055215 | 2/1998 |
| JP | 10-105233 | 4/1998 |
| JP | 10-117973 | 5/1998 |
| JP | 10-118963 | 5/1998 |
| JP | 10-228316 | 8/1998 |
| JP | 0-240343 | 9/1998 |
| JP | 10-240342 | 9/1998 |
| JP | 10-260727 | 9/1998 |
| JP | 10-295595 | 11/1998 |
| JP | 11-065655 | 3/1999 |
| JP | 11-065657 | 3/1999 |
| JP | 11-085269 | 3/1999 |
| JP | 11-102219 | 4/1999 |
| JP | 11-102220 | 4/1999 |
| JP | 11-174145 | 7/1999 |
| JP | 11-175149 | 7/1999 |
| JP | 11-212642 | 8/1999 |
| JP | 11-213157 | 8/1999 |
| JP | 11-508810 | 8/1999 |
| JP | 11-510935 | 9/1999 |
| JP | 11-295412 | 10/1999 |
| JP | 2000-056006 | 2/2000 |
| JP | 2000-056831 | 2/2000 |
| JP | 2000-066722 | 3/2000 |
| JP | 2000-075925 | 3/2000 |
| JP | 2000-353014 | 12/2000 |
| JP | 2001-022443 | 1/2001 |
| JP | 2001-87182 | 4/2001 |
| JP | 2001-258807 | 9/2001 |
| JP | 2001-265437 | 9/2001 |
| JP | 2001-275908 | 10/2001 |
| JP | 2001-525567 | 12/2001 |
| JP | 2002-078650 | 3/2002 |
| JP | 2002-204768 | 7/2002 |
| JP | 2002-532178 | 10/2002 |
| JP | 2002-533797 | 10/2002 |
| JP | 2002-323925 | 11/2002 |
| JP | 2002-333920 | 11/2002 |
| JP | 2002-355206 | 12/2002 |
| JP | 2002-360471 | 12/2002 |
| JP | 2002-360482 | 12/2002 |
| JP | 3356170 | 12/2002 |
| JP | 2003-010076 | 1/2003 |
| JP | 2003-010088 | 1/2003 |
| JP | 2003-015740 | 1/2003 |
| JP | 2003-05296 | 2/2003 |

(56) References Cited

FOREIGN PATENT DOCUMENTS

| | | |
|---|---|---|
| JP | 2003-036116 | 2/2003 |
| JP | 2003-038401 | 2/2003 |
| JP | 2003-038402 | 2/2003 |
| JP | 2003-505127 | 2/2003 |
| JP | 3375843 | 2/2003 |
| JP | 2003-061882 | 3/2003 |
| JP | 2003-167628 | 6/2003 |
| JP | 2003/180586 | 7/2003 |
| JP | 2003/262520 | 9/2003 |
| JP | 2003/304992 | 10/2003 |
| JP | 2003-310489 | 11/2003 |
| JP | 2003/310509 | 11/2003 |
| JP | 2004-123040 | 4/2004 |
| JP | 2004/148021 | 5/2004 |
| JP | 2004-160102 | 6/2004 |
| JP | 2004-174228 | 6/2004 |
| JP | 2005-135400 | 5/2005 |
| JP | 2005-245916 | 9/2005 |
| JP | 2005/352707 | 10/2005 |
| JP | 2005-346700 | 12/2005 |
| JP | 2006/043071 | 2/2006 |
| JP | 2006-079145 | 3/2006 |
| JP | 2006-079157 | 3/2006 |
| JP | 2006/155274 | 6/2006 |
| JP | 2006-247467 | 9/2006 |
| JP | 2006-260161 | 9/2006 |
| JP | 2006-293662 | 10/2006 |
| JP | 2006-296697 | 11/2006 |
| JP | 2007/034866 | 2/2007 |
| JP | 2007-213180 | 8/2007 |
| JP | 2009-015611 | 1/2009 |
| JP | 2010-198552 | 9/2010 |
| WO | 95/26512 | 10/1995 |
| WO | 97/15224 | 5/1997 |
| WO | 97/40734 | 11/1997 |
| WO | 97/41451 | 11/1997 |
| WO | 98/53456 | 11/1998 |
| WO | 99/16078 | 4/1999 |
| WO | 99/28800 | 6/1999 |
| WO | 99/38056 | 7/1999 |
| WO | 99/38237 | 7/1999 |
| WO | 99/43250 | 9/1999 |
| WO | 99/59042 | 11/1999 |
| WO | 00/04430 | 1/2000 |
| WO | 00/36962 | 6/2000 |
| WO | 00/38026 | 6/2000 |
| WO | 00/38028 | 6/2000 |
| WO | 00/38029 | 6/2000 |
| WO | 00/78410 | 12/2000 |
| WO | 01/06904 | 2/2001 |
| WO | 01/06905 | 2/2001 |
| WO | 02/39864 | 5/2002 |
| WO | 02/39868 | 5/2002 |
| WO | 02/058527 | 8/2002 |
| WO | 02/062194 | 8/2002 |
| WO | 02/067744 | 9/2002 |
| WO | 02/067745 | 9/2002 |
| WO | 02/069775 | 9/2002 |
| WO | 02/071175 | 9/2002 |
| WO | 02/074150 | 9/2002 |
| WO | 02/075356 | 9/2002 |
| WO | 02/075469 | 9/2002 |
| WO | 02/075470 | 9/2002 |
| WO | 02/101477 | 12/2002 |
| WO | 03/026474 | 4/2003 |
| WO | 03/040845 | 5/2003 |
| WO | 03/040846 | 5/2003 |
| WO | 2004/004533 | 1/2004 |
| WO | 2004/006034 | 1/2004 |
| WO | 2004/043215 | 5/2004 |
| WO | 2004/058028 | 7/2004 |
| WO | 2004/059409 | 7/2004 |
| WO | 2005/006935 | 1/2005 |
| WO | 2005/036292 | 4/2005 |
| WO | 2005/055795 | 6/2005 |
| WO | 2005/055796 | 6/2005 |
| WO | 2005/077244 | 8/2005 |
| WO | 2005/082223 | 9/2005 |
| WO | 2006/061133 | 6/2006 |
| WO | 2006/068403 | 6/2006 |
| WO | 2006/073248 | 7/2006 |
| WO | 2007/036490 | 4/2007 |

OTHER PUBLICATIONS

Doty, Keith L et al., "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.

Electrolux, "Facts on the Trilobite," http://trilobiteelectroluxse/presskit_en/node1335.asp?print=yes&pressID=, accessed Dec. 12, 2003 (2 pages).

Electrolux designed for the well-lived home, website: http://www.electroluxusa.com/node57.as?currentURL=node142.asp%3F, accessed Mar. 18, 2005, 5 pgs.

eVac Robotic Vacuum S1727 Instruction Manual, Sharper Image Corp, Copyright 2004, 16 pgs.

Evolution Robotics, "NorthStar—Low-cost Indoor Localization, How it Works," E Evolution robotics , 2 pages, 2005.

Everyday Robots, website: http://www.everydayrobots.com/index.php?option=content&task=view&id=9, accessed Apr. 20, 2005, 7 pgs.

Friendly Robotics Robotic Vacuum RV400—The Robot Store website: http://www.therobotstore.com/s.n1/sc.9/category,-109/it.A/id.43/.f, accessed Apr. 20, 2005, 5 pgs.

Gat, Erann, "Robust Low-computation Sensor-driven Control for Task-Directed Navigation," Proceedings of the 1991 IEEE, International Conference on Robotics and Automation, Sacramento, California, Apr. 1991, pp. 2484-2489.

Hitachi, News release, The home cleaning robot of the autonomous movement type (experimental machine) is developed, website: http://www.i4u.com/japanreleases/hitachirobot.htm, accessed Mar. 18, 2005, 5 pgs.

Kahney, "Wired News: Robot Vacs are in the House," website: http://www.wired.com/news/print/0,1294,59237,00.html, accessed Mar. 18, 2005, 6 pgs.

Karcher Product Manual Download webpage: "http://wwwkarchercom/bta/downloadenshtml?ACTION=SELECTTEILENR& ID=rc3000&-submitButtonName=Select+Product+Manual" and associated pdf file "5959-915enpdf (47 MB) English/English" accessed Jan. 21, 2004.

Karcher RC 3000 Cleaning Robot—user manual Manufacturer: Alfred-Karcher GmbH & Co, Cleaning Systems, Alfred Karcher—Str 28-40, PO Box 160, D-71349 Winnenden, Germany, Dec. 2002.

Karcher, "Karcher RoboCleaner RC 3000 Product Details," http://www.robocleaner.de/english/screen3.html, 4 pages, accessed Dec. 12. 2003.

Karcher USA, RC3000 Robotic Cleaner, website: http://www.karcher-usa.com/showproducts.php?op=view_prod&Param1=143& param2=¶m3=, accessed Mar. 18, 2005, 6 pgs.

Koolvac Robotic Vacuum Cleaner Owner's Manual, Koolatron, Undated, 26 pgs.

Put Your Roomba . . . On "Automatic" Roomba Timer> Timed Cleaning—Floorvac Robotic Vacuum webpages: http://cgi.ebay.com/ws/eBayISAPI.dll?ViewItem&category=43575198387&rd=1, accessed Apr. 20, 2005, 5 pgs.

Put Your Roomba . . . On "Automatic" webpages: "http://www.acomputeredge.com/roomba," accessed Apr. 20, 2005, 5 pgs.

The Robo Maid, "RoboMaid Sweeps Your Floors So You Won't Have to," the Official Website, http://www.robomaid.com, 2 pages, accessed Mar. 15, 2005.

Robot Review Samsung Robot Vacuum (VC-RP30W), website: http://www.onrobo.com/reviews/At_Home/Vacuum_Cleaners/on00vcrp30rosam/index.htm, accessed Mar. 18, 2005, 11 pgs.

Robotic Vacuum Cleaner—Blue, website: http://www.sharperimage.com/us/en/catalog/productview.jhtml?sku=S1727BLU, accessed Mar. 18, 2005, 3 pgs.

(56) References Cited

OTHER PUBLICATIONS

Schofield, Monica, "Neither Master nor Slave, A Practical Study in the Development and Employment of Cleaning Robots,", 1999 Proceedings EFA '99 1999 7th IEEE International Conference on Emerging Technologies and Factory Automation, vol. 2, Barcelona, Spain Oct. 18-21, 1999, pp. 1427-1434, 1999.
Sebastian Thrun, Learning Occupancy Grip Maps With Forward Sensor Models, School of Computer Science, Carnegie Mellon University, pp. 1-28.
Zoombot Remote Controlled Vacuum—RV-500 New Roomba 2, website: http://egi.ebay.com/ws/eBayISAPI.dll?ViewItem&category=43526&item=4373497618&rd=1, accessed Apr. 20, 2005, 7 pgs.
Office Action in Japanese Patent Application No. 2003-008478, drafting date of Jan. 8, 2004, and English language translation thereof.
Prassler, et al., "A Short History of Cleaning Robots", Autonomous Robots 9, 211-226, Kluwer Academic Publishers, 2000.
Jarosiewicz, Eugenio, "EEL 5666 Intelligent Machine Design Laboratory", University of Florida, Department of Electrical and Computer Engineering, Aug. 4, 1999, 50 pages.
Office Action in U.S. Appl. No. 10/056,804, dated Apr. 21, 2003.
Notice of Allowance in U.S. Appl. No. 10/056,804, dated Oct. 21, 2003.
Notice of Allowance in U.S. Appl. No. 10/696,456, dated Apr. 13, 2004.
Office Action in U.S. Appl. No. 10/921,775, dated Mar. 10, 2005.
Notice of Allowance in U.S. Appl. No. 10/921,775, dated Jun. 16, 2005.
Office Action in U.S. Appl. No. 11/221,392, dated Nov. 30, 2005.
Office Action in U.S. Appl. No. 11/221,392, dated Jun. 6, 2006.
Notice of Allowance in U.S. Appl. No. 11/221,392, dated Jan. 8, 2007.
Office Action in U.S. Appl. No. 11/691,735, dated Oct. 17, 2007.
Office Action in U.S. Appl. No. 11/929,558, dated Aug. 11, 2008.
Notice of Allowance in U.S. Appl. No. 11/929,558, dated Mar. 26, 2009.
Notice of Allowance in U.S. Appl. No. 11/929,558, dated May 29, 2009.
Notice of Allowance in U.S. Appl. No. 11/929,608, dated Mar. 26, 2009.
Office Action in U.S. Appl. No. 12/540,564, dated Oct. 28, 2010.
Notice of Allowance in U.S. Appl. No. 12/540,564, dated Apr. 20, 2011.
Notice of Allowance in U.S. Appl. No. 12/827,016, dated Nov. 17, 2010.
Notice of Allowance in U.S. Appl. No. 12/827,016, dated Mar. 14, 2011.
English language translation of EP 1380245, published Jan. 2004.
English language translation of EP 1557730, published Jul. 2005.
English language translation of JP 2003/061882, published Mar. 2003.
English language translation of WO 02/071175, published Sep. 2002.
English language translation of WO 2004/058028, published Jul. 2004.
English language translation of WO 2004/059409, published Jul. 2004.
English language translation of WO 2005/055795, published Jun. 2005.
English language translation of WO 2006/061133, published Jun. 2006.
English language translation of WO 2006/068403, published Jun. 2006.
LG RoboKing V-R4000, http://www.popco.net/zboard/view.php?id=tr_review&no=40, Aug. 5, 2005, 15 pages, copyright date 1999-2011.
Dome Style Robot Room Cleaner, http://www.rakuten.co.jp/matsucame/587179/711512/, 7 pages.
Dyson's Robot Vacuum Cleaner—the DC06, http://www.gizmag.com/go/I282/ 3 pages, dated May 2, 2004.
Electrolux Trilobite ZA 1, http://www.electrolux-ui.com:8080/2002%5C822%5C833102EN.pdf 10 pages, dated Jan. 12, 2001.
Electrolux Trilobite, http://www.robocon.co.kr/trilobite/Presentation_Trilobite_Kor_030104.ppt 19 pages, undated.
Electrolux web site Sep. 2002, http://www.frc.ri.cmu.edu/~hpm/talks/Extras/trilobite.desc.html 2 pages, dated Sep. 2002.
Euroflex Intellegente Monster manual, English language excerpt, cover and pp. 17-30, undated.
Euroflex Monster, http://www.euroflex.tv/novita_dett.php?id=15 1 page, dated Jan. 1, 2006.
Floorbotics VR-8 Floor Cleaning Robot, http://www.consensus.com.au/SoftwareAwards/CSAarchive/CSA2004/CSAart04/FloorBot/FX1%20Product%20Description%2020%20January%202004.pdf, (2004), 11 pages.
Friendly Robotics RV Manual, http://www.robotsandrelax.com/PDFs/RV400Manual.pdf pp. 1-18. dated 2004.
Hitachi Robot Cleaner, It's eye, www.hitachi.co.jp/rd/pdf/topics/hitac2003_10.pdf, Oct. 2003, 2 pages, copyright date 2003.
Hitachi Robot Cleaner, http://www.hitachi.co.jp/New/cnews/h1_030529_h1_030529.pdf, 8 pages, dated May 29, 2003.
LG Announces the First Robotic Vacuum Cleaner of Korea, Robot Buying Guide, http://robotbg.com/news/2003/04/22/lg_announces_the_first_robotic_vacuum_cleaner_of_korea, 1 page, Apr. 21, 2003.
Roboking-Not Just a Vacuum Cleaner, a Robot!, http;//infocom.uz/2004/01/21/robokingne-prosto-pyilesos-a-robot/, Jan. 21, 2004, foreign language version, 7 pages.
Roboking-Not Just a Vacuum Cleaner, a Robot!, http;//infocom.uz/2004/01/21/robokingne-prosto-pyilesos-a-robot/, Jan. 21, 2004, English version, 5 pages.
Clean Mate 365 Intelligent Automatic Vacuum Cleaner Model QQ-1 User Manual, www.metapo.com/support/user_manual.pdf 3 pages, undated.
Microrobot UBot MR-UB01k, http://us.aving.net/news/view.php?articleId=23031 5 pages, dated Aug. 25, 2006.
Robotic Vacuum by Matsushita About to undergo Field Testing, http://www.taipeitimes.com/News/worldbiz/archives/2002/03/26/0000129338 2 pages, dated Mar. 26, 2002, copyright date 1999-2011.
Matsushita robotic cleaner, http://techon.nikkeibp.co.jp/members/01db/200203/1006501/ 3 pages, dated Mar. 25, 2002, copyright date 1995-2011.
Matsushita robotic cleaner, http://ascii.jp/elem/000/000/330/330024/ 9 pages, dated Mar. 25, 2002.
Sanyo Robot Cleaner http://www.itmedia.cojp/news/0111/16/robofesta_m.html, 4 pages, dated Nov. 16, 2001.
Sanyo Robot Cleaner http://www.itmedia.co.jp/news/0111/16/robofesta_m2.html, 3 pages, dated Nov. 16, 2001.
Yujin Robotics, An Intelligent Cleaning Robot "Iclebo Q", http://us.aving.net/news/view.php?articleId=7257 8 pages, dated Sep. 2, 2005.
Vacuum Cleaner Robot Operated in Conjunction with 3G Cellular Phone, http://www.toshiba.co.jp/tech/review/2004/09/59_09pdf/a13.pdf pp. 53-55, dated 2004.
Toshiba prototype, http://warp.ndl.gojp/info:ndljp/pid/258151/www.soumu.gojp/joho_tsusin/policyreports/chousa/netrobot/pdf/030214_1_33_a.pdf, pp. 1-16, dated 2003.
SVET Kompujutera Robot usisivac http://www.sk.rs/1999/10/sknt01.html, foreign language version, 1 page, dated Oct. 1999, copyright date 1984-2011.
SVET Kompjutera Robot Vacuum Cleaner, SKWeb 2:54, English version, dated Oct. 1999, 1 page, copyright date 1984-2011.
Robo Vac, Arbeitet ohne Aufsicht, Maschinemarkt, Wurzbuig 105 (1999) 27, 3 pages, dated Jul. 5, 1999.
U.S. Appl. No. 60/605,066, filed on Aug. 27, 2004.
U.S. Appl. No. 60/605,181, filed on Aug. 27, 2004.
Hitachi, "Feature," http://kadenfan.hitachi.co.jp/robot/feature/feature.html, 1 page, accessed Nov. 19, 2008, dated May 29, 2003.
Microbot, "Home Robot—UBOT," http://www.microrobotusa.com/product_1_1_.html, 2 pages, accessed Dec. 2, 2008, copyright date 2007.
InMach, "Intelligent Machines," http://www.inmach.de/inside.html, 1 page, accessed Nov. 19, 2008.

(56) References Cited

OTHER PUBLICATIONS

Hammacher Schlemmer, "Electrolux Trilobite Robotic Vacuum at Hammacher Schlemmer," www.hammacher.com/publish/71579.asp?promo=xsells, 3 pages, accessed Mar. 18, 2005, copyright date 2004.

TotalVac.com. "Karcher RC3000 RoboCleaner Robot Vacuum at Total Vac." www.totalvac.com/robot_vacuum.htm, 3 pages, accessed Mar. 18, 2005, copyright date 2004.

MobileMag, Samsung unveils high-tech robot vacuum cleaner, http://www.mobilemag.com/content/100/102/C2261/, 4 pages, accessed Mar. 18, 2005, dated Nov. 25, 2003, copyright date 2002-2004.

Iirobotics.com, Samsung unveils its multifunction robot vacuum, Samsung Robot Vacuum (VC-RP3OW), http://www.iirobotics.com/webpages/hotstuff.php?ubre=111, 3 pages, accessed Mar. 18, 2005, dated Aug. 31, 2004.

OnRobo, Samsung unveils it multifunction robot vacuum. http://www.onrobo.com/enews/0210/samsung_vacuum.shtml, 3 pages, accessed Mar. 18, 2005, copyright date 2004.

Gregg, M. et al., "Autonomous Lawn Care Applications", 2006 Florida Conference on Recent Advances in Robotics, FCRAR May 25-26, 2006, pp. 1-5.

UAMA (Asia) Industrial Co. Ltd., "Robot Family." 1 page, indicates available in 2005.

Matsutek Enterprises Co. Ltd., "Automatic Rechargeable Vacuum Cleaner," http://matsutek.manufacturer.globalsources.com/si/6008801427181/pdtl/Home-vacuum/10, 3 pages, accessed Apr. 23, 2007, copyright date 2007.

LG, RoboKing, 4 pages. Undated.

Collection of pictures of robotic cleaners, devices AA-BF. 50 pages. Undated.

Braunstingl et al., "Fuzzy Logic Wall Following of a Mobile Robot Based on the Concept of General Perception," Sep. 1995. ICAR '95, 7th Int'l Conference on Advanced Robotics, Sant Feliu De Guixols, Spain, pp. 367-376.

Yata et al.. "Wall Following Using Angle Information Measured by a Single Ultrasonic Transducer," Proceedings of the 1998 IEEE, International Conference on Robotics & Automation. Leuven. Belgium. pp. 1590-1596, May, 1998.

Tse et al., "Design of a Navigation System for a Household Mobile Robot Using Neural Networks" Dept. of Manufacturing Engg. & Engg. Management, City University of Hong Kong, pp. 2151-2156. 1998.

Wolf, J. et al., "Robust Vision-Based Localization by Combining an Image-Retrieval System with Monte Carlo Localization". IEEE Transactions on Robotics. vol. 21. No. 2 pp. 208-216, Apr. 2005.

Eren et al., "Accuracy in Position Estimation of Mobile Robots Based on Coded Infrared Signal Transmission," Proceedings: Integrating Intelligent Instrumentation and Control, Instrumentation and Measurement Technology Conference, IMTC/95, pp. 548-551, 1995.

Karlsson, N. et al. "Core Technologies for Service Robotics", Proceedings of 2004 IEEE/RSJ International Conference on Intelligent Robots and Systems, Sep. 28-Oct. 2, 2004, Sendai Japan, pp. 2979-2984.

Leonard et al., "Mobile Robot Localization by Tracking Geometric Beacons," IEEE Transactions on Robotics and Automation, vol. 7, No. 3, pp. 376-382, Jun. 1991.

Paromtchik, "Toward Optical Guidance of Mobile Robots." Proceedings of the Fourth World Multiconference on Systemics, Cybernetics and Informatics, Orlando, FL, USA, Jul. 23-26, 2000, vol. IX, six pages.

Wong, EIED Online>>Robot Business, ED Online ID# 13114, 17 pages, Jul. 26, 2006, copyright date 2006.

Facchinetti et al., "Using and Learning Vision-Based Self-Positioning for Autonomous Robot Navigation," ICARCV '94, The Third International Conference on Automation, Robotics and Computer Vision, Singapore, vol. 3 pp. 1694-1698, Nov. 1994.

Facchinetti et al., "Self-Positioning Robot Navigation Using Ceiling Images Sequences," ACCV'95, pp. 1-5, Dec. 5-8, 1995.

King et al., "Heplmate-TM-Autonomous Mobile Robot Navigation System," SPIE, vol. 1388, Mobile Robots V, pp. 190-198, 1990.

Fairfield et al., "Mobile Robot Localization with Sparse Landmarks," Proceedings of SPIE, vol. 4573, pp. 148-155, 2002.

Benayad-Cherif et al., "Mobile Robot Navigation Sensors," SPIE, vol. 1831, Mobile Robots VII pp. 378-387, 1992.

The Sharper Image, e-Vac Robotic Vacuum, SI727 Instructions, www.sharperimage.com , 18 pages, copyright 2004.

Ebay, Roomba Timer → Timed Cleaning—Floorvac Robotic Vacuum, Cgi.ebay.com/ws/eBay|SAP|.dll?viewitem&category=43526&item=4375198387&rd=1, 5 pages, Apr. 20, 2005.

Friendly Robotics , "Friendly Robotics—Friendly Vac, Robotic Vacuum Cleaner," http://www.friendlyrobotics.com/vac.htm, 4 pages, accessed Apr. 20, 2005.

Ebay, Zoombot Remote Controlled Vacuum-RV-500 NEW Roomba 2, Cgi.ebay.com/ws/ebay|SAP|.d11?viewitem&category?43526&item=4373497618&RD=1, 7 pages, Apr. 20, 2005.

The Sharper Image, E Vac Robotic Vacuum, http://www.sharperimage.com/us/en/templates/products/pipmorework1printable.jhtml, 1 page, accessed Mar. 18, 2005.

Office Action from U.S. Appl. No. 11/671,305, dated Aug. 22, 2007.

Notice of Allowance in U.S. Appl. No. 12/540,564, dated Dec. 26, 2012.

Notice of Allowance in U.S. Appl. No. 12/540,564, dated Sep. 12, 2012.

Notice of Allowance in U.S. Appl. No. 12/540,564, dated Apr. 17, 2012.

Notice of Allowance in U.S. Appl. No. 12/540,564, dated Feb. 13, 2012.

Notice of Allowance in U.S. Appl. No. 12/540,564, dated Oct. 11, 2011.

* cited by examiner

ROBOT CONFINEMENT

CROSS-REFERENCE TO RELATED APPLICATIONS

This application for U.S. patent is a continuation of U.S. patent application Ser. No. 12/540,564 filed Aug. 13, 2009, which is a continuation of U.S. patent application Ser. No. 11/929,558 filed Oct. 30, 2007, now U.S. Pat. No. 7,579,803, which is a continuation of U.S. patent application Ser. No. 11/691,735 filed Mar. 27, 2007, which is a continuation of U.S. patent application Ser. No. 11/221,392 filed Sep. 8, 2005, now U.S. Pat. No. 7,196,487, which is a continuation of U.S. patent application Ser. No. 10/921,775 filed Aug. 19, 2004, now U.S. Pat. No. 6,965,209, which is a continuation of U.S. patent application Ser. No. 10/696,456 filed Oct. 29, 2003, now U.S. Pat. No. 6,781,338, which is a divisional of U.S. patent application Ser. No. 10/056,804 filed Jan. 24, 2002, now U.S. Pat. No. 6,690,134, which claims the benefit of U.S. Provisional Application No. 60/263,692 filed Jan. 24, 2001, the contents of all of which are expressly incorporated by reference herein in their entireties.

BACKGROUND OF THE INVENTION

The invention relates to a method and system for robot localization and confinement.

There have been many systems proposed in the prior art for confining a robot to specific physical space for the purpose of performing work. These systems are typically designed for any number of robotic applications such as lawn care, floor cleaning, inspection, transportation, and entertainment, where it is desired to have a robot operate in a confined area for performing work over time.

By way of example, a vacuuming robot working in one room may unintentionally wander from one room to another room before satisfactorily completing the vacuuming of the first room. One solution is to confine the robot to the first room by closing all doors and physically preventing the robot from leaving the first room. In many houses, however, open passageways often separate rooms, and doors or other physical barriers cannot easily be placed in the robot's exit path. Likewise, a user may desire to only have the robot operate in a portion of a single open space and, therefore, letting the robot work in the entire room decreases efficiency.

It is therefore advantageous to have a means for confining the area in which a robot works.

One approach in the prior art is to provide sophisticated systems for navigation and orientation for the robot such that the robot either travels along a predetermined path and/or monitors its current location against a map stored in memory. These systems require sophisticated hardware, such as precision sensors and significant computer memory and computational power, and typically do not adapt well to changes in the area in which the robot is working. Likewise the robot cannot simply be taken from one building to another building, or even from room-to-room, without significant reprogramming or training.

For example, the method disclosed in U.S. Pat. No. 4,700,427 (Knepper) requires a means for generating a path for the robot to travel, which can be either a manually-controlled teaching of the path or automatic mapping function. If "the place of use is frequently changed" or the "rooms are modified," large amounts of data memory is required in order to store information related to each location. Similarly, the method and system disclosed in U.S. Pat. No. 4,119,900 (Kremnitz) requires powerful computation and sensors to constantly ascertain the orientation of the robot in a given space. Other examples of robotic systems requiring inputted information about the space in which the robot is working include methods and systems shown in U.S. Pat. No. 5,109,566 (Kobayashi et al.) and U.S. Pat. No. 5,284,522 (Kobayashi et al.).

Similarly, certain prior art systems not only require the training or programming of the robot to the specifics of a particular space, but also require some preparation or alteration to the space in which the robot is to work. For example, U.S. Pat. No. 5,341,540 (Soupert et al.) discloses a system in which in a preferred embodiment requires the robot to include a positioning system and that the area for the robot be set up with "marking beacons . . . placed at fixed reference points." While this system can avoid an unknown obstacle and return to its preprogrammed path through signals from the beacons, the system requires both significant user set-up and on-board computational power.

Similar systems and methods containing one or more of the above-described disadvantages are disclosed in U.S. Pat. No. 5,353,224 (Lee et al.), U.S. Pat. No. 5,537,017 (Feiten et al.), U.S. Pat. No. 5,548,511 (Bancroft), and U.S. Pat. No. 5,634,237 (Paranjpe).

Yet another approach for confining a robot to a specified area involves providing a device defining the entire boundary of the area. For example, U.S. Pat. No. 6,300,737 (Bergvall et al.) discloses an electronic bordering system in which a cable is placed on or under the ground to separate the inner area from the outer area. Likewise, the system disclosed in U.S. Pat. No. 6,255,793 (Peless et al.) requires installation of a metallic wire through which electricity flows to define a border. While these systems provide an effective means for confinement, they are difficult to install, are not portable from room-to-room, and can be unsightly or a tripping hazard if not placed underground or beneath carpeting. Equally important, such systems can be difficult to repair if the wire or other confinement device breaks, as the location of such breaks can be difficult to determine when the system is placed underground or under carpet.

The present invention provides a modified and improved system for confining a robot to a given space without the drawbacks of the prior art.

SUMMARY OF THE INVENTION

In accordance with the present invention a robot confinement system is disclosed comprising: a portable barrier signal transmitter, wherein said barrier signal is transmitted primarily along an axis, said axis defining a barrier; a mobile robot, where said mobile robot comprises means for turning in at least one direction, a barrier signal detector, and a control unit controlling said means for turning; whereby the control unit runs an algorithm for avoiding said barrier signal upon detection of said barrier signal, said algorithm comprising the step of turning the robot until said barrier signal is no longer detected.

Accordingly, the present invention has several objects and advantages.

It is an object of the invention to provide a simplified and portable system and method for confining a robot to a given area.

It is an object of the invention to provide a confinement system that does not require installation.

It is an object of the invention to provide a barrier system that can be set up intuitively and includes a means for visually indicating the barrier.

It is an additional object of the invention to provide a system such that a robot approaching the barrier from either side of the barrier will turn in such a way as to avoid crossing the barrier.

It is an object of the invention to provide a robot confinement system that operates regardless of the angle at which the robot approaches the barrier.

It is an additional object of a preferred embodiment of the invention to provide a system that is substantially impervious to the effects of sunlight, will not cause interference with other devices, and will not be interfered by other devices.

The preferred embodiment of the present invention is for a robotic, indoor cleaning device similar to the types disclosed in U.S. Pat. No. 4,306,329 (Yokoi), U.S. Pat. No. 5,293,955 (Lee), U.S. Pat. No. 5,369,347 (Yoo), U.S. Pat. No. 5,440,216 (Kim), U.S. Pat. No. 5,613,261 (Kawakami et al.), 5,787,545 (Colens), U.S. Pat. No. 5,815,880 (Nakanishi), U.S. Pat. No. 6,076,226 (Reed). One of skill in the art will recognize that the present invention can be used in any number of robotic applications where confinement is desired. In addition, while the preferred embodiments described herein are for a robot without a navigation system, one of skill in the art will recognize the utility of the invention in applications using more sophisticated robots.

Other features and advantages of the invention will be apparent from the following detailed description, including the associated drawings, and from the claims.

DETAILED DESCRIPTION

Figure 1A:
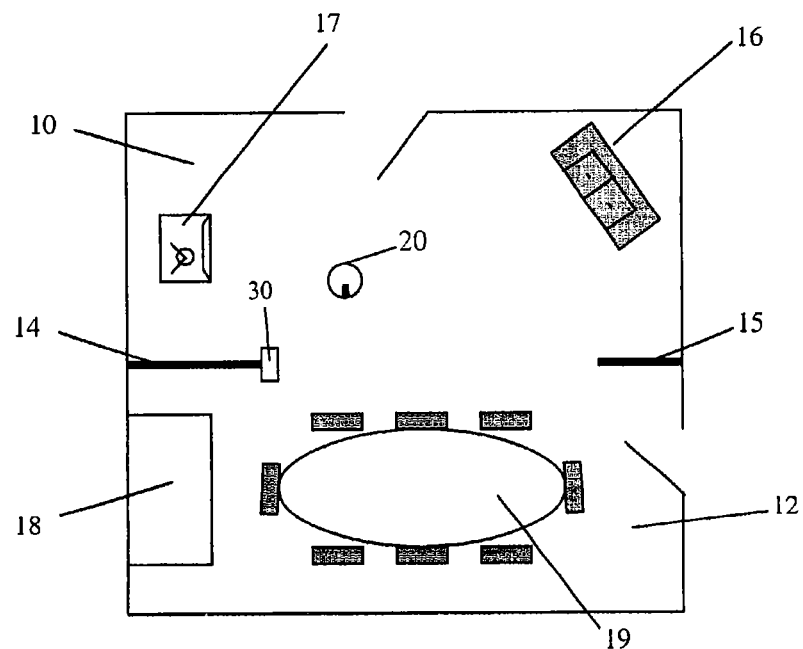
FIG. 1A shows an embodiment of the robot confinement system according to the invention with the barrier signal transmitter in an unpowered state.
Figure 1B:
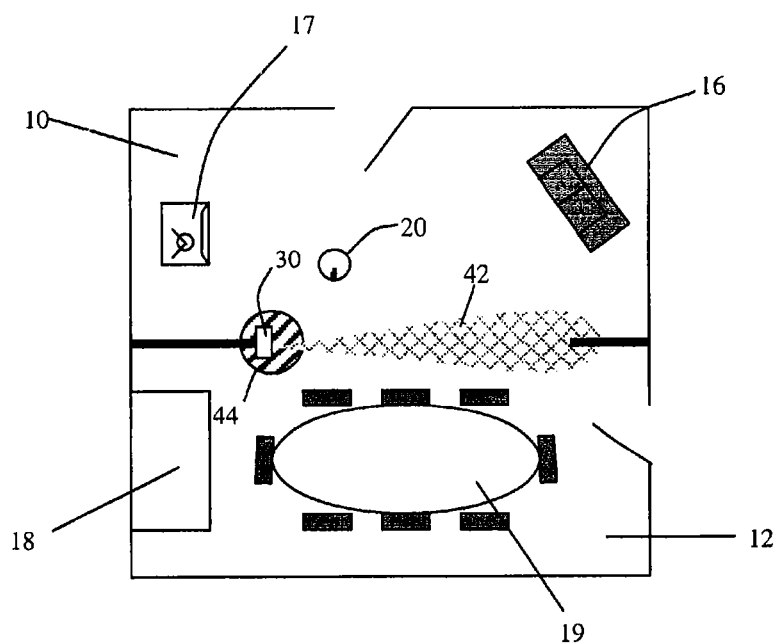
FIG. 1B shows an embodiment of the robot confinement system according to the invention with the barrier signal transmitter in a powered state.

Referring to FIGS. 1A & 1B, living room 10 is shown separated from dining room 12 by interior walls 14 & 15. The living room and/or dining room may contain various furnishings, for example, couch 16, television 17, buffet 18 and table and chairs 19.

The rooms also contain a mobile robot 20 and a barrier signal transmitting device 30, which for purposes of this specification is also called a robot confinement (or RCON) transmitter 30. In FIGS. 1A & 1B, the robot is placed in the living room 10, and the RCON transmitter 30 is placed in the area dividing the living room 10 from the dining room 12, against interior wall 14 and pointing toward interior wall 15.

As described in more detail herein, FIG. 1B shows the same configuration of rooms with the RCON transmitter 30 in a powered state emitting, e.g., an infrared beam 42 from the RCON transmitter 30 toward interior wall 15. The beam 42 is directed primarily along an axis to create a boundary or barrier between living room 10 and dining room 12.

The system and method described herein each rely on a portable RCON transmitting unit 30 and a mobile robot 20. Each of these elements is first described independently, then the operation of a preferred embodiment of the invention is discussed.

RCON Transmitter

Figure 2A:
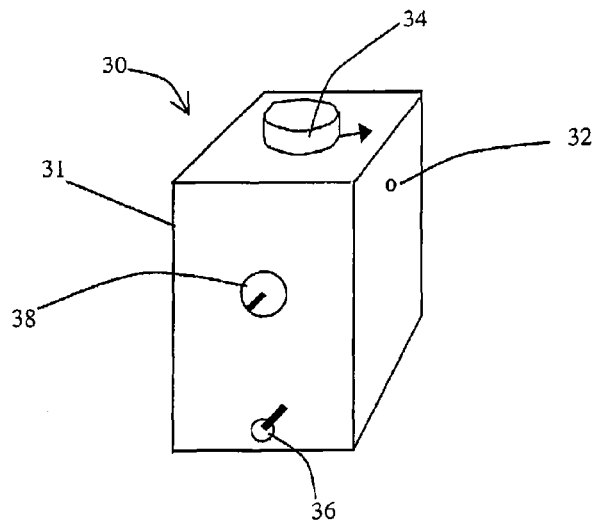
FIG. 2A shows a schematic representation of a preferred embodiment of the barrier signal transmitter.
Figure 2B:
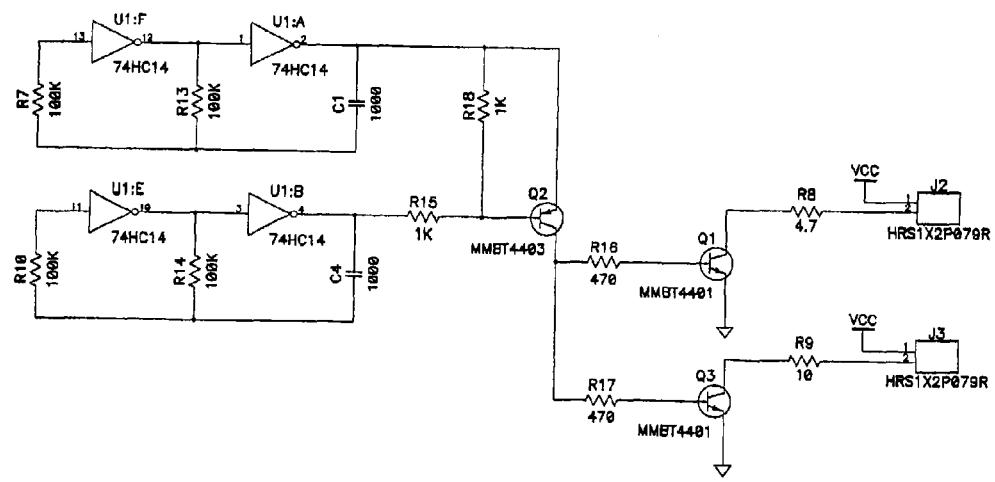
FIG. 2B shows a circuit diagram of a specific embodiment of the barrier signal transmitter.

FIG. 2A illustrates a preferred embodiment of the RCON transmitter 30. The RCON transmitter 30 includes a first infrared emitter 32, a second infrared emitter 34, a power switch 36, and variable power-setting knob 38. The RCON transmitter enclosure 31 also houses the batteries (not shown) and necessary electronics for the various components. FIG. 2B shows a circuit diagram for the necessary electronics for an embodiment of the RCON transmitter 30. Other embodiments may use other conventional power sources.

In the embodiment shown in FIG. 2A, a user would turn on the RCON transmitter 30 using power switch 36 at the same time as the robot 20 begins operation. The user can also select a variable power using knob 38. In other embodiments, any number of known input devices can be used to turn on the unit and/or select a power setting, such as keypads, toggle switches, etc. A higher power can be used to provide a longer barrier useful for dividing a single room, while a lower power setting can be used to provide a barrier for a single doorway. Because of the reflective properties of various materials such as walls painted white, it is preferable to limit the power of the RCON transmitter 30 to the minimum necessary to provide the desired barrier.

In alternative embodiments, the RCON transmitter's power may be automatically turned off after a predetermined amount of time in order to preserve battery life.

In alternative embodiments, a control system can be used to turn on and turn off one or more RCON transmitters and/or robots in order to allow automatic cleaning of multiple rooms or spaces in a controlled manner. For example, a "smart house" control system might communicate directly with one or more RCON transmitters allowing a cycling of work spaces. In the alternative, the robot 20 might send a signal to the RCON to turn it on.

In the preferred embodiment, two infrared emitters 32 & 34 are used. The first IR emitter 32—the primary emitter—is powered to provide a directed barrier 42 of a given length from the RCON transmitter 30. In this embodiment, the beam 42 is a modulated, narrow IR beam. In the preferred embodiment, a collimated IR emitter is used such as Waitrony p/n IE-320H. The specifics of the emitter(s) are left to one of skill in the art; however, as explained in detail below, the beam 42 must have sufficient width. It is preferred that the minimum beam width be greater than the turning radius of the detector on a particular robot.

The second IR emitter 34—the secondary emitter—is powered to provide a diffuse region 44 near the RCON transmitter 30 to prevent robot 20 from crossing the beam 42 in its most narrow region closest to the RCON transmitter 30 and, in addition, prevents robot 20 from coming into direct contact with the RCON transmitter 30. In the preferred embodiment, a lens identical to the lens portion of the RCON detector, described below, is used for the secondary emitter 34. In other embodiments, a single active emitter operatively connected to appropriate optics can be used to create multiple emission points, including the two emitter system disclosed herein.

Because of potential interference from sunlight and other IR sources, most IR devices, such as remote controls, personal digital assistances and other IR communication devices, modulate the emitted signal. Herein, the emitters 32 & 34 modulate the beam at 38 kHz. In addition, IR devices modulate the beam to provide a serial bit stream to the unit being controlled to tell it what to do. In an embodiment of the present invention, additional modulation of the beam at a frequency, for example 500 Hz, different from the frequency of common IR bit streams prevents interference with other IR equipment.

While the preferred embodiment uses an infrared signal, the system and method of the present invention can use other signals such as electromagnetic energy to accomplish the goals, including radio waves, X-rays, microwaves, etc. Many of these types of waves have significant drawbacks. For example, radio waves are more difficult and expensive to make directional, and visible light suffers from interference from many sources and may be distracting to users. Sound waves could also be used, but it is similarly difficult to make purely directional and tend to scatter and reflect more.

Robot

Figure 3A:
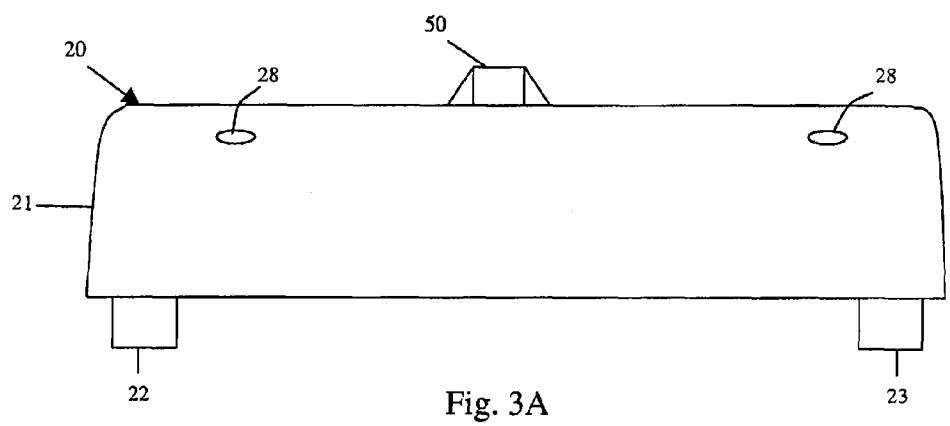
FIG. 3A shows a side-view schematic representation of a mobile robot used in a preferred embodiment of the invention.
Figure 3B:
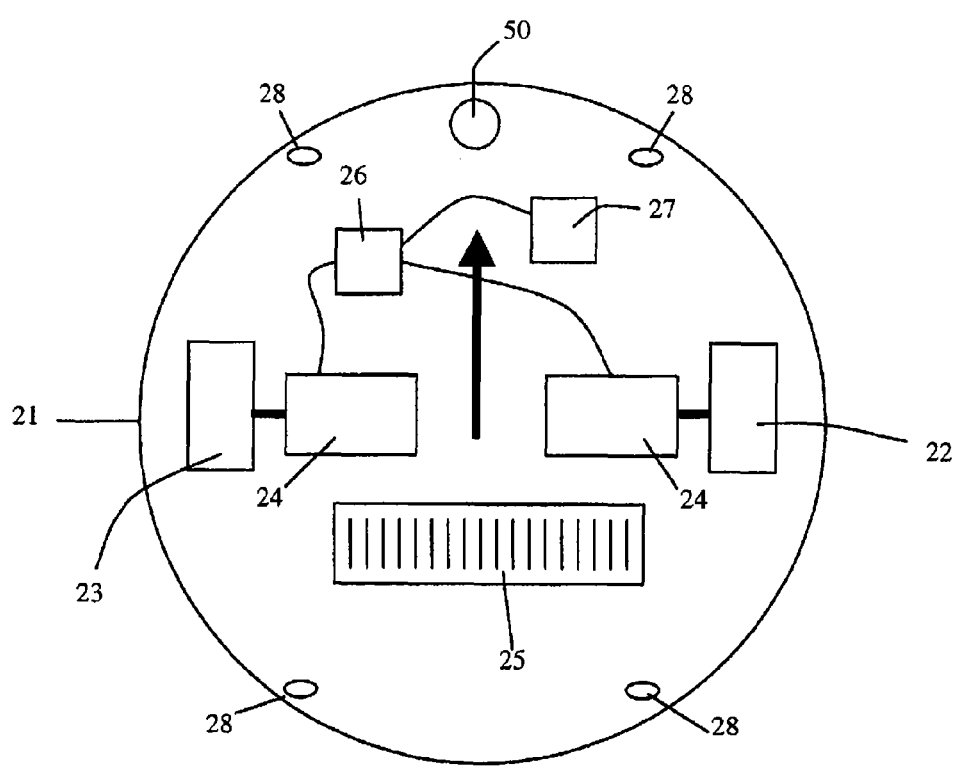
FIG. 3B shows a top-view schematic representation of a mobile robot used in a preferred embodiment of the invention.

As shown in FIGS. 3A & 3B, in the preferred embodiment, the robot 20 comprises a substantially circular shell 21 mounted to a chassis containing two wheels 22 & 23 mounted on opposite sides of a center line, wherein each of the wheels 22 & 23 can be independently driven to allow the robot to turn. In the preferred embodiment, the wheels are mounted in such a manner as to allow the robot to turn substantially in place. The preferred embodiment of the robot 20 also comprises motors 24, cleaning mechanism 25, rechargeable battery 26, microprocessor 27, and various tactile and optical sensors 28.

Figure 5:
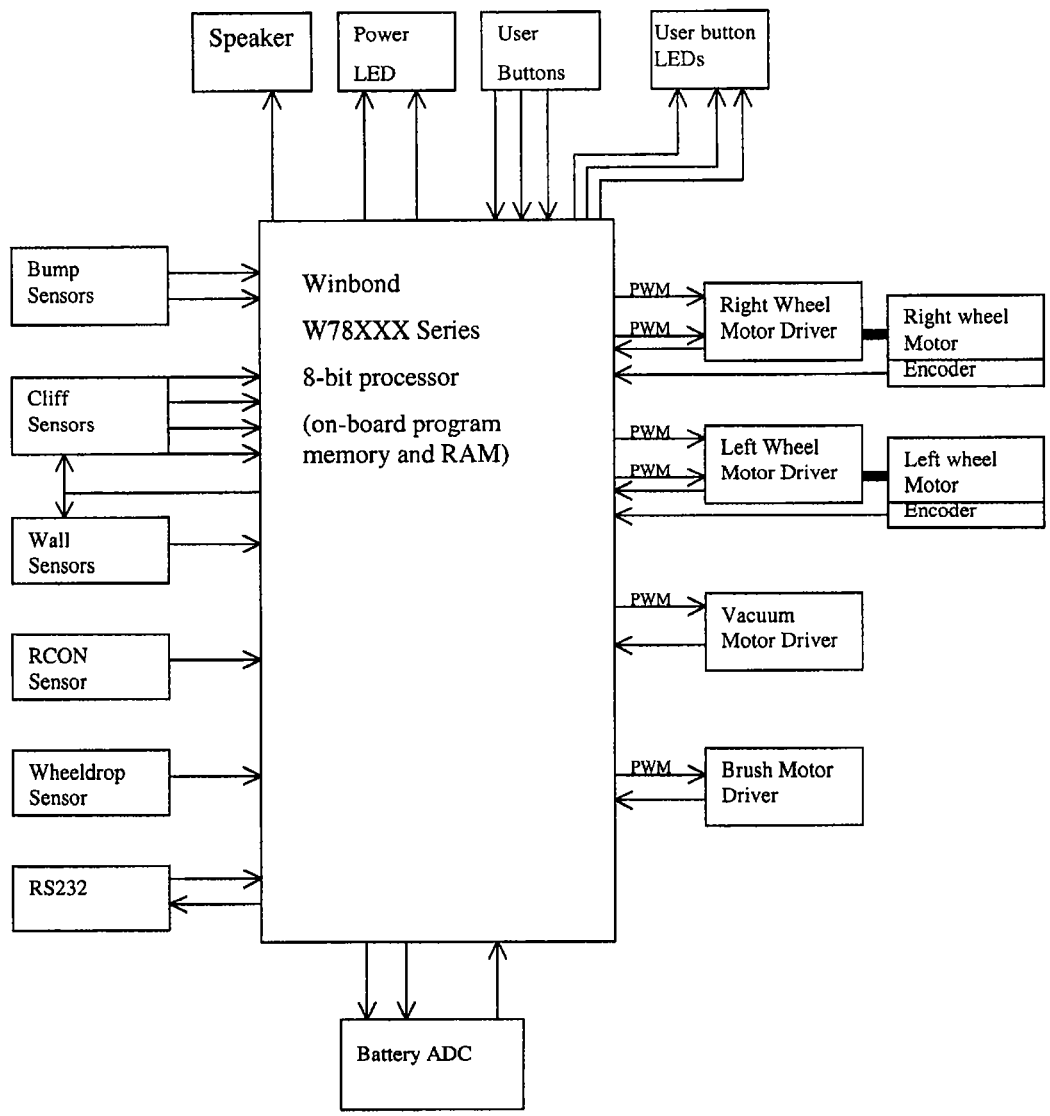
FIG. 5 demonstrates a hardware block diagram of the robot shown in FIGS. 3A & 3B.

In FIG. 5 is illustrated a hardware block diagram of a robot similar to the one shown in FIGS. 3A & 3B. The hardware is built around a Winbond W78 XXX Series 8-bit processor. The processor is controlled by software stored in ROM. The system shown in FIG. 5 includes various control functions and motor drivers, along with various sensors (e.g. physical bump sensors, cliff sensors, the RCON detector/sensor).

For the instant invention, the robot also has an RCON detector 50, which in the preferred embodiment is a standard IR receiver module, which comprises a photodiode and related amplification and detection circuitry, mounted below an omni-directional lens, where omni-directional refers to a single plane. In a preferred embodiment, the IR receiver module is East Dynamic Corporation p/n IRM-8601S. However, any IR receiver module, regardless of modulation or peak detection wavelength, can be used as long as the RCON emitter is also changed to match the receiver. As shown in FIGS. 3A & 3B, the RCON detector is mounted at the highest point on the robot 20 and toward the front of the robot as defined by the primary traveling direction of the robot, as indicated by an arrow in FIG. 3B.

While the RCON detector should be mounted at the highest point of the robot in order to avoid shadows, it is desirable in certain applications to minimize the height of the robot 20 and/or the RCON detector 50 to prevent operational difficulties and to allow the robot 20 to pass under furniture or other obstacles. In certain embodiments, the RCON detector 50 can be spring mounted to allow the detector to collapse into the body of the robot when the robot runs under a solid overhanging object.

Figure 4:
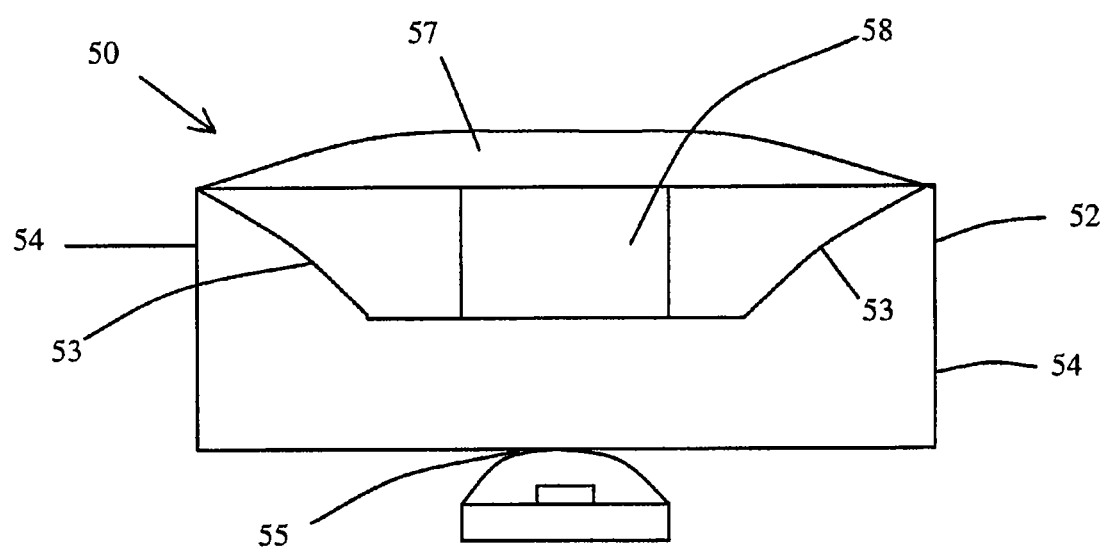
FIG. 4 shows a side-view of a preferred embodiment of an omni-directional barrier signal detector.

FIG. 4 shows in detail the preferred embodiment of the RCON detector 50. The RCON detector 50 includes a lens 52 that allows in the barrier signal (or rays) 42 from all directions through the outer lens wall 54 and focuses the rays at IR detector 55. At the same time, the method and systems of the present invention are likely to be used in the presence of sunlight. Because direct sunlight can easily saturate the IR detector 55, efforts may be made to exclude sunlight from the RCON detector 50. Therefore, in the preferred embodiment, opaque plastic horizontal plate 57 is used, which is supported by post 58.

The lens 52 used in the preferred embodiment is a primarily cylindrical device designed to accept rays perpendicular to the axis of the lens and to reject rays substantially above or substantially below the plane perpendicular to the axis of the lens. The lens focuses horizontal rays primarily on IR detector 55 mounted below the lens.

In the preferred embodiment, the geometry of the lens is determined by rotating a parabola about its focus, where the focus is collocated with the active element of the receiver 55. The inner lens wall 53 is thereby defined by the swept parabola. The rays are reflected by the phenomena called total internal reflection, defined here by the discontinuation between the lens material and the material internal to the inner lens wall 53. The preferred embodiment is constructed of clear polycarbonate chosen for its low cost and index of refraction.

The omni-directional nature of the RCON detector 50 allows a system with only a single RCON detector 50 to function equally well regardless of the angle of incident radiation from the RCON transmitter. If the RCON detector 50 is insensitive to the beams 42 & 44 from certain angles, then the robot 20 can break through the confining beams 42 & 44 when the robot 20 approaches the beam(s) such that the beam(s) occupies the RCON detector 50 blind spot.

In addition, in the preferred embodiment, the RCON transmitter 30 is battery powered. This imposes a high sensitivity requirement on the robot-mounted detector 50 in order to promote long battery life in the emitter 30. As such, the RCON detection system should be designed to gather as much IR as possible from the emitter(s).

The RCON detector of the preferred embodiment is designed to be triggered by modulated IR above a certain intensity threshold. If the IR levels are below the given threshold, the RCON detector computes no detection whatsoever and therefore triggers no specific control commands.

Figure 6:
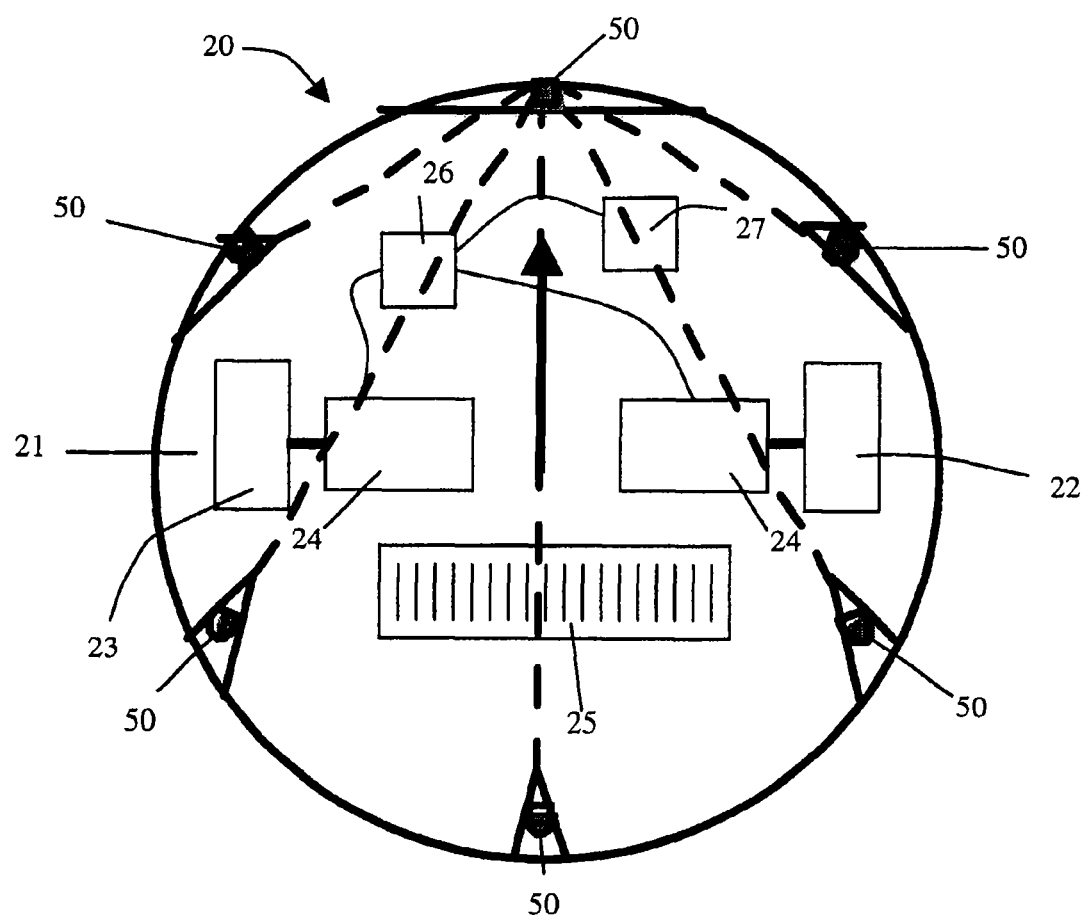
FIG. 6 shows a schematic representation of an alternative embodiment of the robot employing multiple barrier signal detectors.

One of skill in the art will recognize that in alternative embodiments multiple RCON detectors 50 can be used. FIG. 6 illustrates such an embodiment using six side-mounted sensors 50. Each of the sensors should be oriented in a manner to have its field of view correspond to that of the single, top mounted sensor. Because a single, omni-directional RCON detector should be mounted at the highest point of the robot for optimal performance, it is possible to lower the profile of the robot by incorporating multiple detectors.

As disclosed above, the system and method of the present invention can be used with any number of robots existing in the prior art, including those designed for indoor cleaning applications.

Operation of System & Method

Figure 8A:
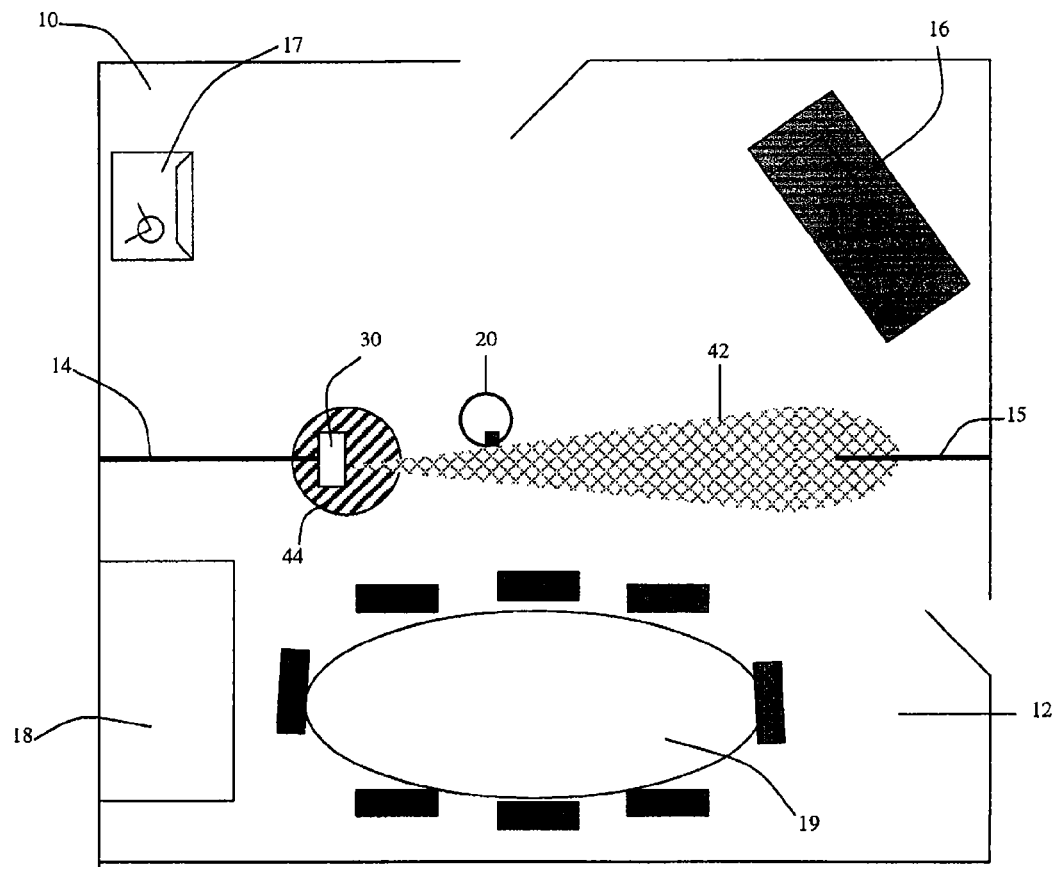
FIGS. 8A-C are schematic illustrations of the system and method of a preferred embodiment of the present invention.
Figure 8B:
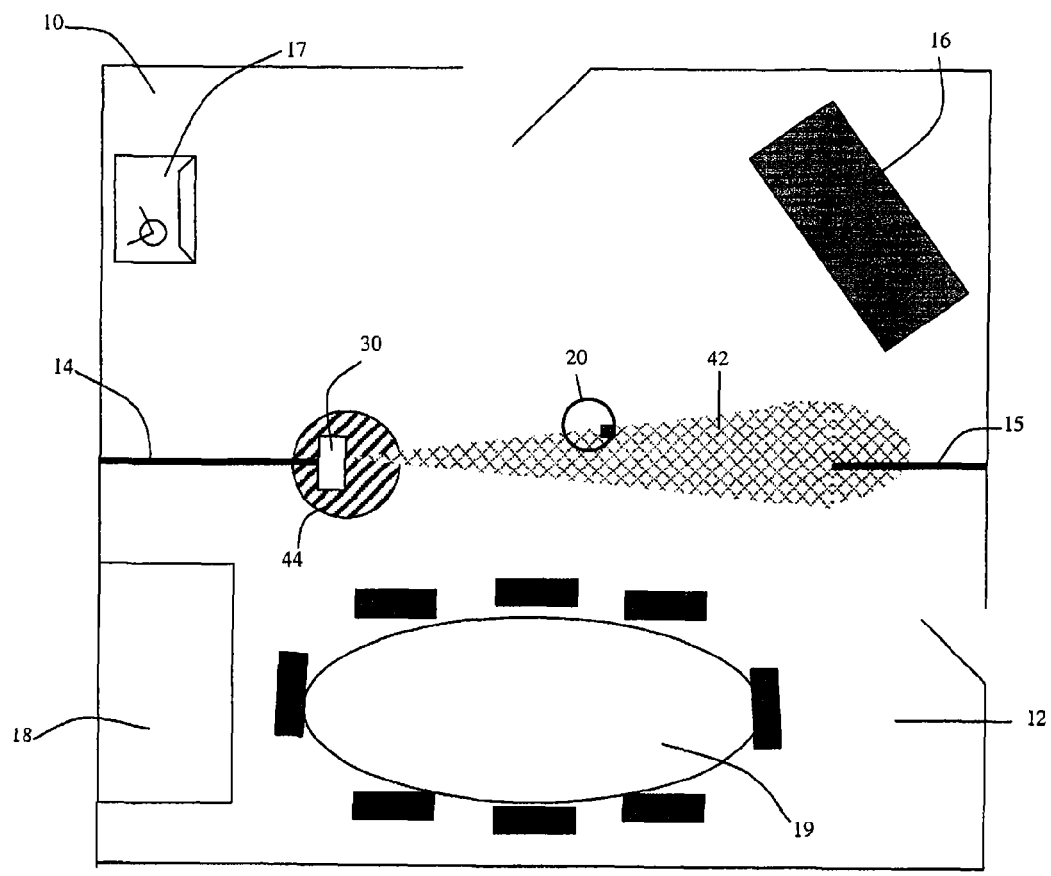
Figure 8C:
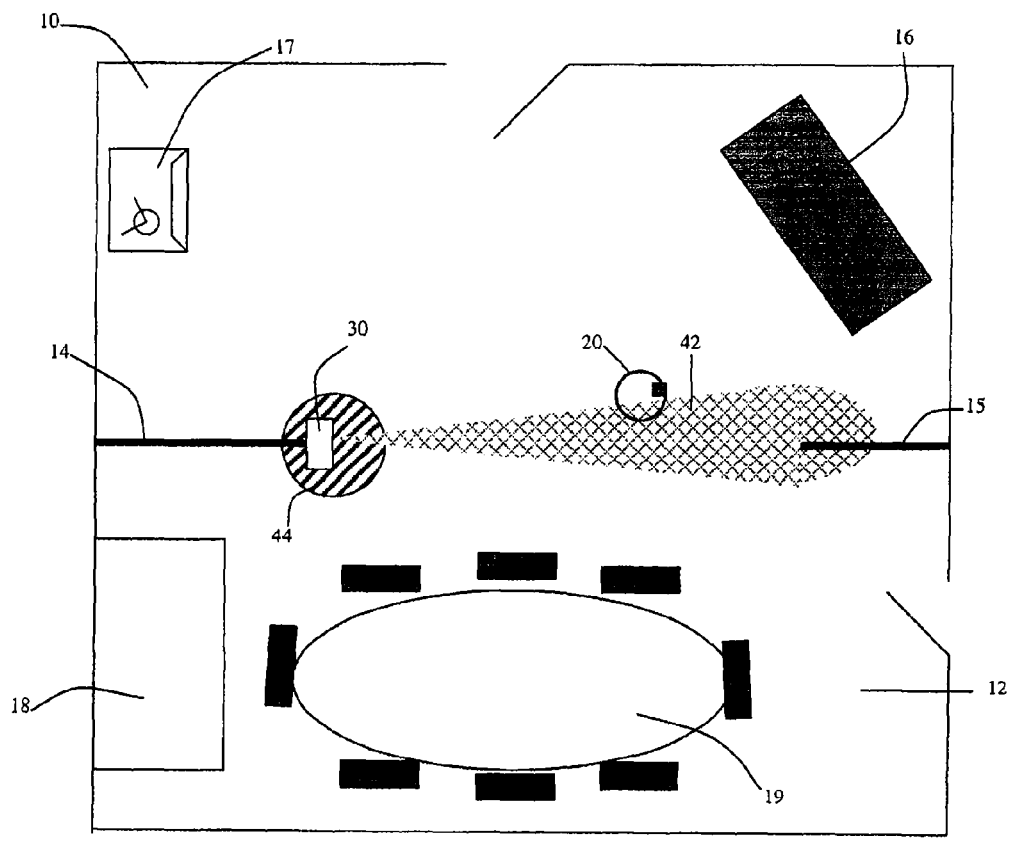

As shown in FIGS. 8A-C, an IR beam is used to divide the space (living room 10 and dining room 12) into two distinct areas. The robot has a sensor for detecting this beam 42 mounted at the robot's top front. As seen in FIG. 8B, whenever a measurable level of IR radiation strikes the detector the robot's IR avoidance behavior is triggered. In a preferred embodiment, this behavior causes the robot to spin in place to the left until the IR signal falls below detectable levels (FIG. 8C). The robot then resumes its previous motion. Spinning left is desired in certain systems because, by convention, the robot attempts to keep all objects to its right during following operations. The robot's confinement behavior is consistent with its other behaviors if it spins left on detecting the confining beam 42. In this embodiment, the IR sensor acts as a gradient detector. When the robot encounters a region of higher IR intensity the robot spins in place. Because the IR sensor is mounted at the front of the robot and because the robot does not move backward, the sensor always sees the increasing IR intensity before other parts of the robot. Thus spinning in place causes the sensor to translate to a region of decreased intensity. When the robot next moves forward, following the sensor, the robot necessarily moves to a region of decreased IR intensity—away from the beam.

In another preferred embodiment, the room confinement behavior works as a single behavior in a strictly priority based behavior system which controls the robot's motion. Each of the behaviors is assigned a priority, and the behavior with the highest priority requests control of the robot at any given time and has full control of the robot. These behaviors may include driving forward, turning when bumped, spiraling, etc. The confinement behavior is one of the highest priority behaviors. It requests control of the robot when the room confinement IR sensor has detected a signal from a room confinement transmitter.

Figure 7A:
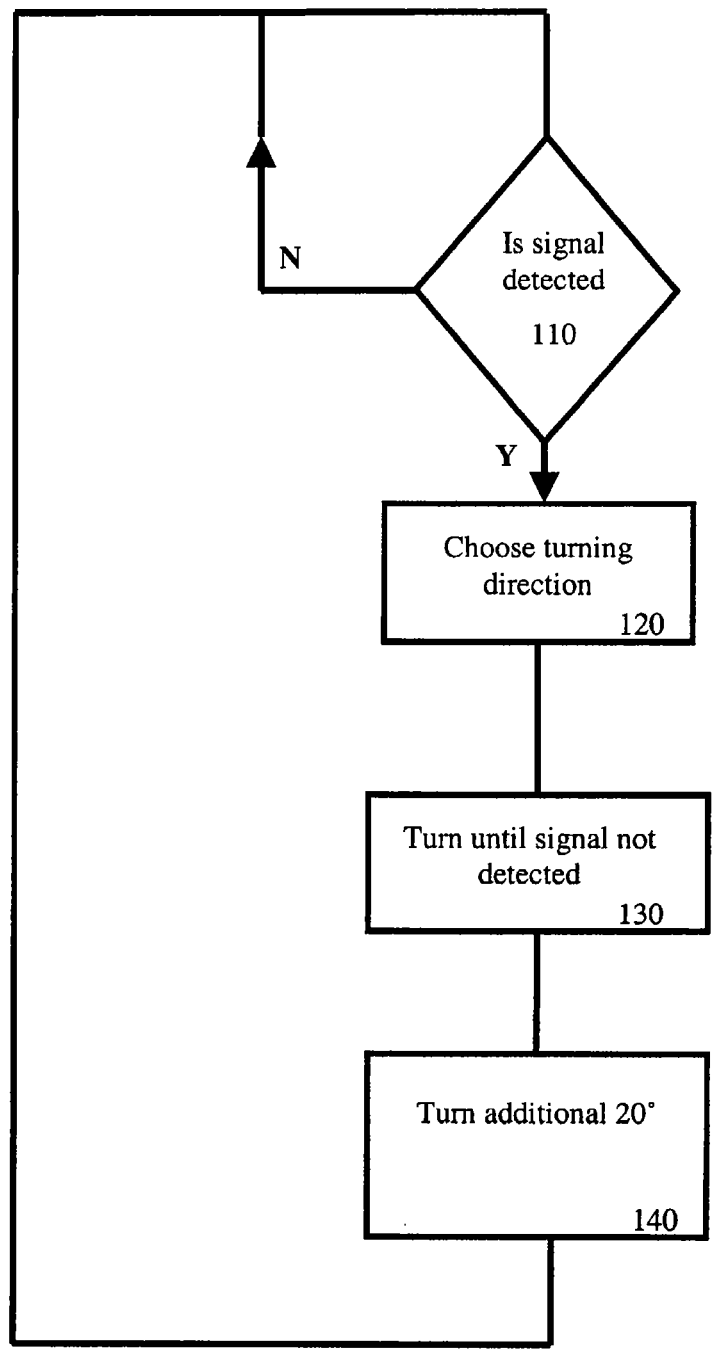
FIGS. 7A & 7B are flow-chart illustrations of the barrier avoidance algorithm of a preferred embodiment of the invention.

A flow-chart of a preferred embodiment of the control logic of the confinement behavior is shown in FIG. 7A. The robot determines whether the RCON detector detects a signal (step 110). If a signal is detected, the robot chooses a turning direction (step 120). The robot then begins to turn in the chosen direction until the signal is no longer detected (step 130). Once the signal is no longer detected, the robot continues turning for an additional distance (step 140).

Figure 7B:
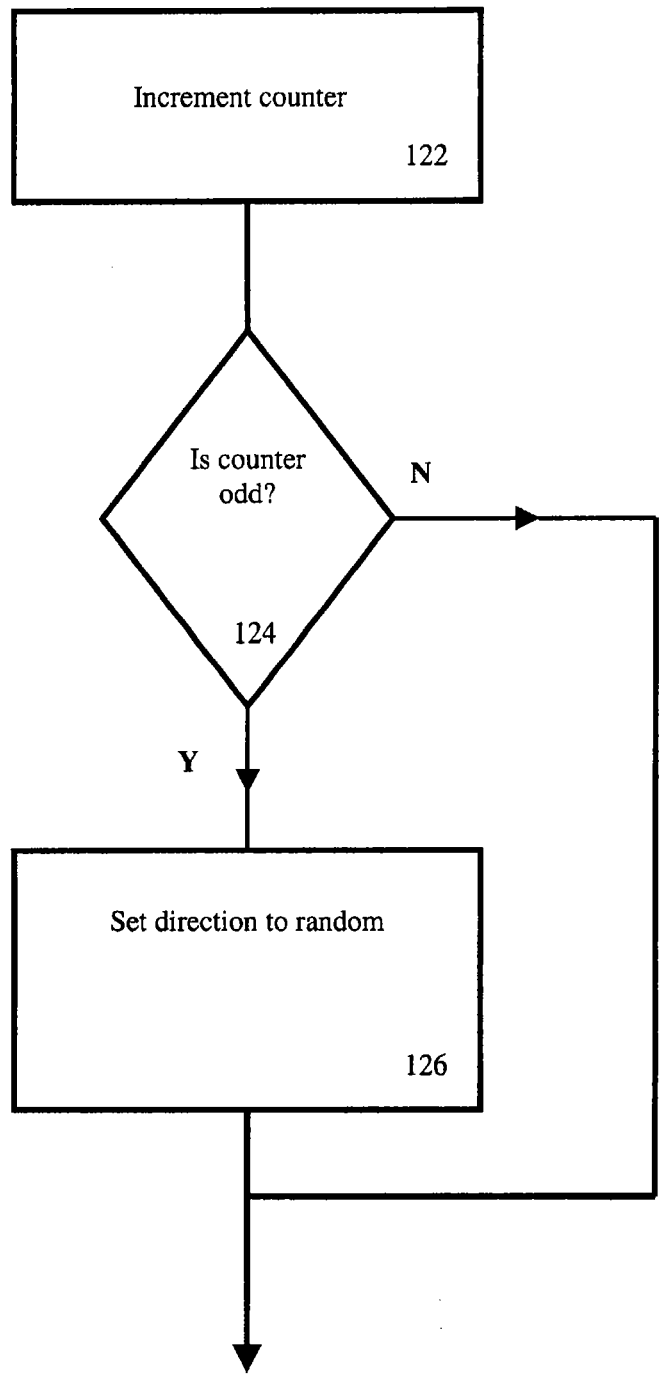

In the preferred embodiment of step 120, the direction is chosen through the algorithm illustrated in the flow chart shown in FIG. 7B. The robot's control logic keeps track of the robot's discrete interactions with the beam. The robot first increments the counter by one (step 122). On odd numbered interactions, the robot chooses a new turning direction randomly (steps 124 & 126); on even numbered interactions, the robot again uses its most recent turning direction.

In other embodiments, the robot can always turn a single direction or choose a direction randomly. When the robot always turns one direction, the robot may get stuck in a loop by turning away from the beam, bumping into another obstacle in a room, turning back toward the beam, seeing the beam again, turning away, bumping again, ad infinitum. Moreover, when the robot only turns in a single direction, it preferentially ends up at one end of the beam. Where the robot's task is to complete work evenly throughout a room, such as cleaning, a single turning direction is not optimal. If the direction is chosen purely randomly, the robot may turn back and forth quite a bit as it encounters the beam more than once.

In the preferred embodiment of step 140, the robot turns an additional 20 degrees from the point at which the signal is lost. The amount of the turn, which was selected arbitrarily in the preferred embodiment, is left to the particular robot and application. The additional turn prevents the robot from re-encountering the confinement beam immediately after exiting the beam. For various applications, the amount of additional movement (linear or turning) can be a predetermined distance or time, or in the alternative may include a random component.

In still other embodiments, the robot's avoidance behavior may include reversing the robot's direction until the beam 42 is no longer detected.

In other embodiments, the RCON detector is able to determine the gradient levels of the beam. This information can be used to send the robot in the direction of the lowest level of detection and prevent the situation where the robot is situated entirely within the beam and therefore turns in 360 degrees without the detector exiting the beam. In these embodiments, if the robot turns 360 degrees without exiting the beam, the control logic may give a higher priority to a "gradient behavior." The gradient behavior divides the possible robot headings into a fixed number of angular bins, each bin covering an equal sweep of the angular area around the robot. The robot then turns at a constant rate while sampling the number of detections in each angular bin. (For a system using infrared signals, detection counts are monotonically related to the signal strength.) After the robot has rotated more than 360 degrees, the gradient behavior commands the robot to turn toward the angular bin with the lowest detection count. When the robot achieves the correct heading, the gradient behavior commands the robot to move forward a predetermined distance, for example one-half of the width of the robot, then control is released from the gradient behavior. If necessary, this process repeats until the robot has moved into a region where IR intensity is below the detection threshold.

One of skill in the art will recognize that the emitter/detector system can also be used to guide the robot in any number of ways. For example, the beam 42 could be used to allow the robot to perform work parallel to the edge of the beam, allowing, for example, the floor right up to the edge of the room confinement beam to be cleaned.

Figure 9A:
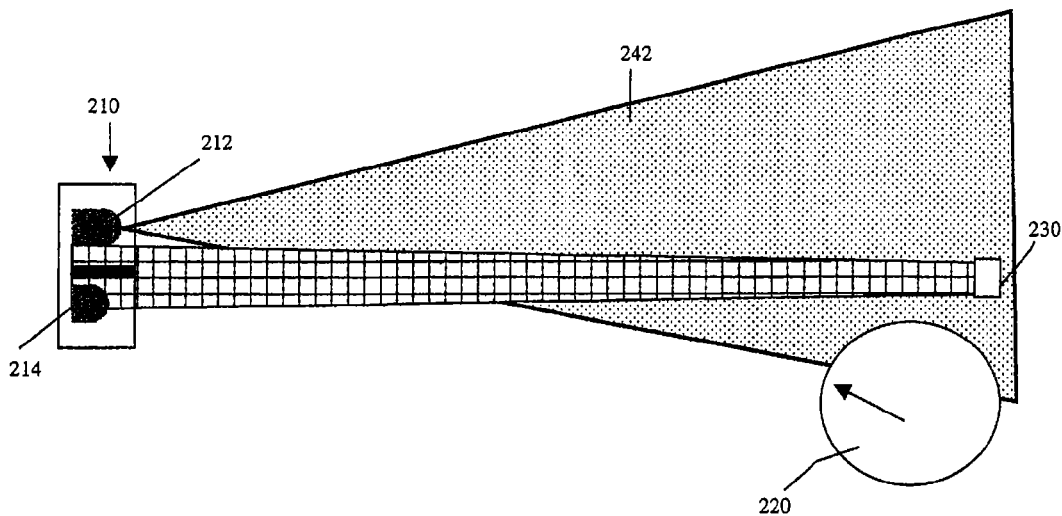
FIGS. 9A-B are schematic illustrations of the system and method of an alternative embodiment of the present invention.

In an alternative embodiment of the present invention, the RCON transmitter may comprise both a signal emitter and a signal detector. As shown in FIG. 9A, the RCON transmitter 210 includes both a primary emitter 212 and a detector 214. The RCON transmitter 210 is placed at one end of the desired barrier and a retroreflector 230 is placed at the opposite end of the desired barrier. The retroreflector, which reflects the beam back toward the emitter regardless of the orientation of the retroreflector relative to the beam, can be constructed from, for example, standard bicycle reflectors. As shown in FIG. 9A, primary emitter 212 produces beam 242. A portion of beam 242 reflects from retroreflector 230 and is detected by detector 214.

Figure 9B:
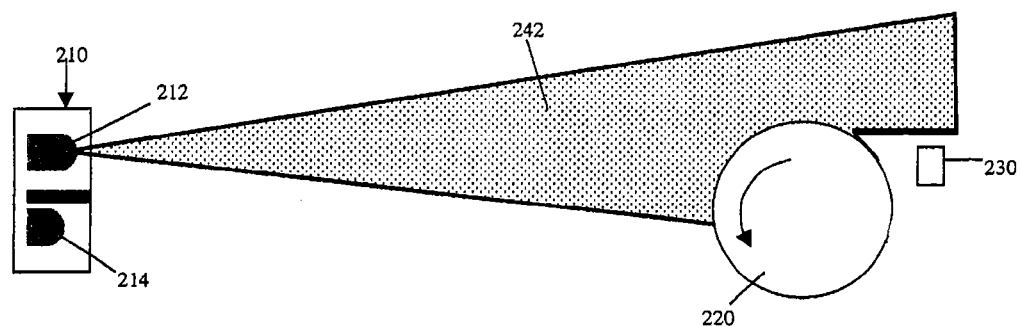

In the embodiment shown in FIGS. 9A & 9B, the IR radiation emitted by the primary emitter 212 can be modulated in either of two ways constituting signal A or signal B. During normal operation, the beam 242 emitted from the primary emitter 212 is reflected by the retro-reflective material 230 back into the detector 214. When this is true the RCON transmitter broadcasts signal A, which is received by robot 220. As shown in FIG. 9B, if the robot or other object comes between the emitter 212 and the retro-reflective material 230 then no signal is returned to the receiver 214 and the RCON transmitter 210 broadcasts signal B, which is received by robot 220. The robot 220 then uses this information to improve its performance. The robot turns away from the beam as described previously only when the robot detects signal B. When the robot detects signal A no action is taken.

For certain applications, the embodiment shown in FIGS. 9A & 9B provides improved performance. For example, in cleaning application, the completeness of cleaning is improved because the robot tends to clean up to the line connecting the confinement device and the retro-reflective material. Also, this embodiment is more resistant to beam blockage. If furniture or other obstacles partially occlude the beam, the robot tends to turn away when it is further from crossing the beam. Finally, an indicator, such as an LED, can be added to the RCON transmitter to indicate when the device is functioning and correctly aimed.

In other embodiments, the RCON transmitter can be used to define an annular confinement region. For example, an RCON transmitter with two omni-directional emitters may be employed, wherein the first emitter would broadcast the standard modulated beam and the second emitter would a emit radiation 180 degrees out of phase with the output of the first emitter, but with less power. The robot would be programmed to turn when the IR was not detected. As the robot gets further from the emitter, it would eventually, lose the beam and turn back into it. As it gets closer, the radiation from the second emitter would jam the radiation from the first emitter, creating essentially unmodulated IR. The detector would fail to detect this, and the robot would again turn back into the annulus.

In yet another embodiment, the RCON transmitter can be used as a "home base." For example, once the voltage of the robots battery drops below a predetermined level, the robot can use the gradient detection behavior to home in on the RCON transmitter. This allows the user to easily find the robot when it has finished cleaning instead of it randomly ending up in corners, under furniture, etc.

Although the description above contain many specificities, there should not be construed as limiting the scope of the invention but as merely providing illustrations of some of the presently preferred embodiments of this invention.

Other embodiments of the invention are within the scope of the following claims.

What is claimed is:

1. A robot confinement system, comprising:
a portable housing including an emitter operable to emit a first signal when a presence of a mobile robot is detected in a field of detection; and
the mobile robot, including:
a shell;
a chassis including at least two wheels;
at least one motor connected to the at least two wheels for moving the mobile robot on a surface;
a cleaner operable to clean the surface as the mobile robot moves on the surface;
a controller operable to control the at least one motor to control a movement path of the mobile robot on the surface;
a detector operable to detect the first signal;
a bump sensor operable to detect a physical contact with the shell as the mobile robot moves on the surface; and
a cliff sensor operable to detect a falling edge of the surface as the mobile robot moves toward the falling edge,
wherein the controller is operable to change the movement path of the mobile robot in response to detection of the first signal, and wherein the controller is operable to change the movement path of the mobile robot in response to direction of the physical contact and in response to detection of the falling edge, and
wherein one of the portable housing and the mobile robot is operable to detect a second signal to detect the presence of the mobile robot in the field of detection, the second signal generated by the other of the portable housing and the mobile robot.

2. The robot confinement system as set forth in claim 1, wherein the second signal is the same as the first signal.

3. The robot confinement system as set forth in claim 1, wherein the portable housing includes a detector operable to detect the second signal.

4. The robot confinement system as set forth in claim 3, wherein the mobile robot is operable to generate the second signal.

5. The robot confinement system as set forth in claim 4, wherein the second signal is a modulated signal.

6. The robot confinement system as set forth in claim 1, wherein the field of detection extends generally linearly from the portable housing on the surface.

7. The robot confinement system as set forth in claim 6, wherein the portable housing includes a power selector operable to variably set a length of the field of detection.

8. The robot confinement system as set forth in claim 6, wherein the controller is operable to change the movement path of the mobile robot to prevent the mobile robot from crossing the field of detection in response to detection of the first signal.

9. The robot confinement system as set forth in claim 1, wherein
the portable housing is operable to emit a third signal that is detectable by the mobile robot when the mobile robot is within a predetermined distance of the portable housing,
the detector is operable to detect the third signal, and
the controller is operable to change the movement path of the mobile robot to prevent the mobile robot from physically contacting the portable housing in response to detection of the third signal.

10. The robot confinement system as set forth in claim 9, wherein the portable housing includes a second emitter operable to emit the third signal.

11. The robot confinement system as set forth in claim 1, wherein the emitter is operable to automatically turn off after a predetermined time period.

12. The robot confinement system as set forth in claim 1, wherein the portable housing includes a receiver operable to receive a fourth signal that changes an on/off status of the portable housing.

13. A robot confinement system, comprising:
a portable housing including an emitter operable to emit a first signal when a presence of a mobile robot is detected in a field of detection; and
a mobile robot, including:
a shell;
a chassis including at least two wheels;
at least one motor connected to the at least two wheels for moving the mobile robot on a surface;
a cleaner operable to clean the surface as the mobile robot moves on the surface;
a controller operable to control the at least one motor to control a movement path of the mobile robot on the surface;
a detector operable to detect the first signal;
a bump sensor operable to detect a physical contact with the shell as the mobile robot moves on the surface; and
a cliff sensor operable to detect a falling edge of the surface as the mobile robot moves toward the falling edge,
wherein the controller is operable to change the movement path of the mobile robot in response to detection of the first signal, and wherein the controller is operable to change the movement path of the mobile robot in response to detection of the physical contact and in response to detection of the falling edge.

14. The robot confinement system as set forth in claim 13, wherein the field of detection extends generally linearly from the portable housing on the surface.

15. The robot confinement system as set forth in claim 14, wherein the portable housing includes a power selector operable to variably set a length of the field of detection.

16. The robot confinement system as set forth in claim 14, wherein the controller is operable to change the movement path of the mobile robot to prevent the mobile robot from crossing the field of detection in response to detection of the first signal.

17. The robot confinement system as set forth in claim 13, wherein
the portable housing is operable to emit a second signal that is detectable by the mobile robot when the mobile robot is within a predetermined distance of the portable housing,
the detector is operable to detect the second signal, and
the controller is operable to change the movement path of the mobile robot to prevent the mobile robot from physically contacting the portable housing in response to detection of the second signal.

18. The robot confinement system as set forth in claim 17, wherein the portable housing includes a second emitter operable to emit the second signal.

19. The robot confinement system as set forth in claim 17, wherein
the first signal and the second signal are distinguishable, and
the controller is operable to selectively change the movement path of the mobile robot based on which of the first signal and the second signal is detected.

20. The robot confinement system as set forth in claim 13, wherein the emitter is operable to automatically turn off after a predetermined time period.

21. The robot confinement system as set forth in claim 13, wherein the portable housing includes a receiver operable to receive a third signal that changes an on/off status of the portable housing.

22. A method for confining a mobile robot with a portable housing, the method comprising:
moving the mobile robot along a movement path on a surface and cleaning the surface with the mobile robot;
generating, with one of the portable housing and the mobile robot, a first signal;
detecting, with the other of the portable housing and the mobile robot, the first signal to detect a presence of the mobile robot in a field of detection, the field of detection extending generally linearly from the portable housing;
emitting, with the portable housing, a second signal when the presence of the mobile robot is detected in the field of detection;
detecting, with the mobile robot, the second signal; and
changing, with the mobile robot, the movement path to prevent the mobile robot from crossing the field of detection in response to detection of the second signal.

23. The method as set forth in claim 22, wherein the first signal is the same as the second signal.

24. The method as set forth in claim 22, wherein the mobile robot generates the first signal and the portable housing detects the first signal.

25. The method as set forth in claim 24, wherein the first signal is a modulated signal.

26. The method as set forth in claim 22, further comprising:
variably setting, with the portable housing, a length of the field of detection.

27. The method as set forth in claim 22, further comprising:
emitting, by the portable housing, a third signal when the mobile robot moves within a predetermined distance of the portable housing;
detecting, by the mobile robot, the third signal emitted by the portable housing; and
changing, by the mobile robot, the movement path of the mobile robot to move the mobile robot outside the predetermined distance of the portable housing in response to detection of the third signal.

28. The method as set forth in claim 22, further comprising:
changing, with the portable housing, an on/off status of the portable housing in response to a predetermined condition,
wherein the predetermined condition occurs when at least one of a predetermined time period lapses and a fourth signal is received by the portable housing.

29. The method as set forth in claim 22, further comprising:
detecting, with the mobile robot, a physical contact with a shell of the mobile robot;
detecting, with the mobile robot, a falling edge of the surface as the mobile robot moves toward the falling edge; and
changing, with the mobile robot, the movement path in response to detection of the physical contact and in response to detection of the falling edge.

30. A robot confinement system, comprising:
a portable housing including an emitter operable to emit a first signal when a presence of a mobile robot is detected in a field of detection, wherein the field of detection extends generally linearly from the portable housing on the surface; and
the mobile robot, including:
a shell;
a chassis including at least two wheels;
at least one motor connected to the at least two wheels for moving the mobile robot on a surface;
a cleaner operable to clean the surface as the mobile robot moves on the surface;
a controller operable to control the at least one motor to control a movement path of the mobile robot on the surface; and
a detector operable to detect the first signal,
wherein the controller is operable to change the movement path of the mobile robot in response to detection of the first signal, and
wherein one of the portable housing and the mobile robot is operable to detect a second signal to detect the presence of the mobile robot in the field of detection, the second signal generated by the other of the portable housing and the mobile robot.

31. A robot confinement system, comprising:
a portable housing including an emitter operable to emit a first signal when a presence of a mobile robot is detected in a field of detection, wherein the field of detection extends generally linearly from the portable housing on the surface; and
a mobile robot, including:
a shell;
a chassis including at least two wheels;
at least one motor connected to the at least two wheels for moving the mobile robot on a surface;
a cleaner operable to clean the surface as the mobile robot moves on the surface;

a controller operable to control the at least one motor to control a movement path of the mobile robot on the surface; and a detector operable to detect the first signal, wherein the controller is operable to change the movement path of the mobile robot in response to detection of the first signal.

* * * * *

UNITED STATES PATENT AND TRADEMARK OFFICE
CERTIFICATE OF CORRECTION

PATENT NO. : 8,659,256 B2
APPLICATION NO. : 12/827126
DATED : February 25, 2014
INVENTOR(S) : Jones et al.

It is certified that error appears in the above-identified patent and that said Letters Patent is hereby corrected as shown below:

On the Title Page, Item [56]:

Page 5, column 2, line 9, delete "electro l uxusa." and insert -- electroluxusa. --, therefor.

Page 5, column 2, line 46, delete "143& param2" and insert -- 143¶m2 --, therefor.

Page 6, column 1, line 69, delete "/I282/" and insert -- /1282/ --, therefor.

Page 6, column 2, line 44, delete ".cojp/" and insert -- .co.jp/ --, therefor.

Page 6, column 2, line 54, delete ".gojp/" and insert -- .go.jp/ --, therefor.

Page 6, column 2, line 55, delete ".gojp/" and insert -- .go.jp/ --, therefor.

Page 6, column 2, line 57, delete "Kompujutera" and insert -- Kompjutera --, therefor.

Page 6, column 2, line 60, delete "SKWeb" and insert -- SK Web --, therefor.

Page 6, column 2, line 62, delete "Maschinemarkt," and insert -- Maschinenmarkt, --, therefor.

Page 6, column 2, line 62, delete "Wurzbuig" and insert -- Wurzburg --, therefor.

Page 6, column 2, line 69, delete ".htm1," and insert -- .html, --, therefor.

Page 7, column 1, line 6, delete "Total Vac.'"" and insert -- TotalVac," --, therefor.

Page 7, column 1, line 33, delete "lnt'l" and insert -- Int'l --, therefor.

Page 7, column 2, line 20, delete ""Heplmate-" and insert -- "Helpmate- --, therefor.

In the Claims:

Column 9, line 64, in Claim 1, delete "direction" and insert -- detection --, therefor.

Signed and Sealed this
Twenty-seventh Day of May, 2014

Michelle K. Lee
*Deputy Director of the United States Patent and Trademark Office*